US008332376B2

(12) United States Patent
Martinez et al.

(10) Patent No.: US 8,332,376 B2
(45) Date of Patent: Dec. 11, 2012

(54) VIRTUAL MESSAGE PERSISTENCE SERVICE

(75) Inventors: Frank Martinez, La Canada, CA (US); Paul Kevin Toth, Daly City, CA (US)

(73) Assignee: Blue Titan Software, Inc., San Francisco, CA (US)

( * ) Notice: Subject to any disclaimer, the term of this patent is extended or adjusted under 35 U.S.C. 154(b) by 86 days.

(21) Appl. No.: 12/469,113

(22) Filed: May 20, 2009

(65) Prior Publication Data

US 2009/0228460 A1    Sep. 10, 2009

Related U.S. Application Data

(60) Division of application No. 10/635,053, filed on Aug. 6, 2003, now Pat. No. 7,546,284, which is a continuation-in-part of application No. 10/460,598, filed on Jun. 11, 2003, now abandoned.

(51) Int. Cl.
  *G06F 17/30* (2006.01)
(52) U.S. Cl. ......... 707/705; 707/706; 707/715; 707/770
(58) Field of Classification Search .................. 707/609, 707/634, 705, 706, 715, 770
  See application file for complete search history.

(56) References Cited

U.S. PATENT DOCUMENTS

| | | |
|---|---|---|
| 6,442,546 B1 | 8/2002 | Biliris et al. |
| 6,938,031 B1 | 8/2005 | Zoltan et al. |
| 2006/0015565 A1 | 1/2006 | Nainani et al. |

OTHER PUBLICATIONS

Russell et al., "Oracle9i Application Developer's Guide-Fundamentals", Copyright 2002, 742 Pages.*

Creekbaum et al., "Oracle8i Replication," copyright 1999, http://www.camden.rutgers.edu/HELP/Documentation/Oracle/server.815/a67791/toc.htm, pp. 1-39.
Bolosky et al., "Feasibility of a Serverless Distributed File System Deployed on an Existing Set of Desktop PCs", copyright 2000, SIGMETRICS, pp. 34-43.
Ramakrishnan et al., "Database Management Systems," Aug. 2002, McGraw-Hill, third edition, pp. 320-321.

* cited by examiner

*Primary Examiner* — Hung Q Pham
(74) *Attorney, Agent, or Firm* — Baker Botts L.L.P.

(57) ABSTRACT

Methods, apparatuses and systems directed to a distributed data repository system including a plurality of symmetric data repository nodes. In certain embodiments of the present invention, the distributed data repository system is message-centric operative to store message payloads transmitted from client nodes. In certain embodiments, the distributed data repository system is BLOB-centric, maintaining binary data objects and indexes of attribute values that map to the binary data objects. Of course, the present invention can be utilized to store a great variety of digital data contained in message payloads. According to certain embodiments of the present invention, the attribute indexes are fully replicated across all data repository nodes, while the message payloads (e.g., data objects or other content) are exchanged across data repository nodes as needed to fulfill client queries. In this manner, each data repository node in the distributed system can fulfill any client request, while reducing the storage and memory requirements for each data repository node. The reduced storage and computational requirements enable each distributed data repository node to be hosted by an inexpensive hardware platform and, therefore, allow for the deployment of large numbers of distributed data repository nodes to achieve a distributed data repository system featuring high availability and reliability. In certain embodiments, each distributed data repository node is further equipped to act as an instant messaging (or other one-way messaging) server to allow client nodes to establish instant messaging connections with the data repository nodes in the distributed system.

21 Claims, 8 Drawing Sheets

VIRTUAL MESSAGE PERSISTENCE SERVICE

CROSS-REFERENCE TO RELATED APPLICATIONS

The present application is a divisional of U.S. application Ser. No. 10/635,053 filed Aug. 6, 2003 and entitled "Virtual Message Persistence Service," which is a continuation-in-part of U.S. application Ser. No. 10/460,598 filed Jun. 11, 2003 and entitled "Virtual Message Persistence Service," which is incorporated by reference herein for all purposes.

FIELD OF THE INVENTION

The present invention relates to data storage technologies and, more particularly, to methods, apparatuses and systems directed to distributed, message-based data repositories.

BACKGROUND OF THE INVENTION

Modern databases and storage area networks feature an array of distributed, but centrally-managed/accessed components cooperating to store vast amounts of data available to client applications connected to the network. A typical distributed database system features a master-slave architecture where the master serves as directory informing client applications which slave to query for the requested information. The master also coordinates operation of the slave databases. Other distributed database approaches feature gateway architectures where the data is distributed across numerous file systems, but the gateway, relative to the client applications, approximates a single monolithic database. To address capacity and reliability issues, these large centrally-managed database architectures require complex software and expensive hardware, and often require experienced personnel dedicated to management of the database system. Reliability and capacity are also addressed by hosting the database applications on extremely expensive, robust hardware systems, such as mainframes, that include multiple processor architectures and reliable construction.

While the foregoing database systems fulfill their respective objectives, a need exists in the art for less expensive alternatives while nevertheless achieving the high availability and reliability of prior art database systems. Certain embodiments of the present invention substantially fulfill this need.

SUMMARY OF THE INVENTION

The present invention provides methods, apparatuses and systems directed to a distributed data repository system including a plurality of symmetric data repository nodes. In certain embodiments of the present invention, the distributed data repository system is message-centric operative to store message payloads transmitted from client nodes. In certain embodiments, the distributed data repository system is BLOB-centric, maintaining binary data objects and indexes of attribute values that map to the binary data objects. Of course, the present invention can be utilized to store a great variety of digital data contained in message payloads. According to certain embodiments of the present invention, the attribute indexes are fully replicated across all data repository nodes, while the message payloads (e.g., data objects or other content) are exchanged across data repository nodes as needed to fulfill client queries. In this manner, each data repository node in the distributed system can fulfill any client request, while reducing the storage and memory requirements for each data repository node. The reduced storage and computational requirements enable each distributed data repository node to be hosted by an inexpensive hardware platform and, therefore, allow for the deployment of large numbers of distributed data repository nodes to achieve a distributed data repository system featuring high availability and reliability. In certain embodiments, each distributed data repository node is further equipped to act as an instant messaging (or other one-way messaging) server to allow client nodes to establish instant messaging connections with the data repository nodes in the distributed system.

In one embodiment, the VMPS system provides a means of indexing and retrieving records that is based on the contents of the BLOB or other data object, as opposed to the attributes explicitly associated with the BLOB in the data record. In one embodiment, the VMPS system supports content-based filters (CBFs) and policy mechanisms that facilitate the content-based indexing and retrieval functionality described herein. This allows for queries based on elements in addition to, or in lieu of, record attributes. In addition, embodiments of the present invention facilitate record insertion, since the system automatically extracts elements of the stored object to build the requisite indexes, obviating the need to explicitly define record all or any record attributes. Embodiments of the present invention can be further extended to provide policy-based query mechanism that fully specifies or modifies an original query based on application of one or more policies and content-based filters. Embodiments of the CBF and policy mechanisms may also be applied to provide for differentiated access to the records in the data repository.

In yet another embodiment, the VMPS system includes a feature set supporting streaming content. In embodiments of the VMPS described above, as in most data repositories, a record is generally thought of as a stable, static entity, changed only in response to specific events, such as updates and deletes. Embodiments of the VMPS system, however, provide a feature set that allows for record content to behave in a dynamic manner. Specifically, and in one embodiment, the VMPS system allows records to be classified as having "continuously-streaming-content" (CSC), wherein the addition of content to the record, in the form of content chunks, essentially never ends. Clients of the VMPS system when retrieving a continuously-streaming-content record essentially subscribe to the data stream associated with the record. In some embodiments, the VMPS system may be deployed to create a "distributed TIVO" or on-demand streaming media system, wherein a CSC record represents the data stream for a particular media channel.

DESCRIPTION OF PREFERRED
EMBODIMENT(S)

A. Overview

Figure 1:
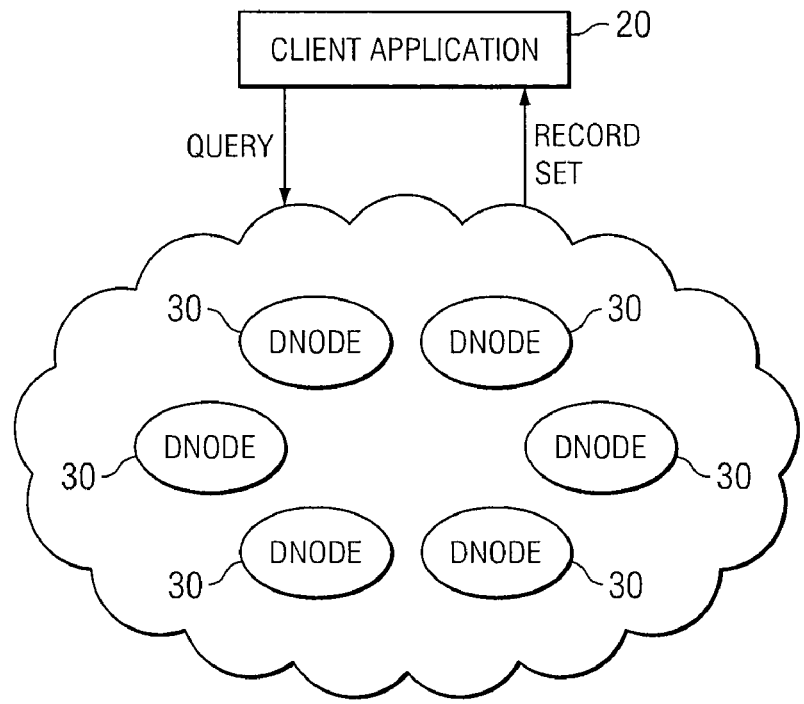
FIG. 1 is a functional block diagram illustrating the basic operation of a distributed data repository system according to an embodiment of the present invention.

FIG. 1 is a functional block diagram illustrating the basic operation of the distributed data repository system according to an embodiment of the present invention. As FIG. 1 suggests, the distributed data repository system of the present invention can be utilized in much the same way as traditional databases and client-server systems. As FIG. 1 provides, a client application 20 composes a query (such as a SQL statement), passes it through a network connection to a database server, and eventually receives a response containing the requested record(s). In this scenario the database server, however, is not a single monolithic entity, but a network of distributed data repository nodes ("dnodes") 30, any of which may produce the record set for any given query, as discussed herein. The Virtual Message Persistence Service (VMPS) system described herein provides access to a data repository distributed across an arbitrarily large number of symmetric, networked nodes 30. This replicated architecture, in one embodiment, allows each dnode 30 to be implemented in an inexpensive network appliance or server, as opposed to the often extremely expensive enterprise-grade database servers of the prior art. In addition, the distributed data repository system can be deployed over a variety of computer networks, such as Local Area Networks, Wide Area Networks, and Public or Open Networks, such as the Internet.

In this context, "symmetric" is used to express that any dnode may serve any database request. That is, if a client application inserts a record at dnode B, it may then retrieve it from dnode C, or any other dnode in the VMPS system. Second, all dnodes 30 play substantially identical roles in the VMPS system. That is, if one dnode may be used to accomplish a database-related task, they may all be used to accomplish that task. In one embodiment, all dnodes 30 further act as directory servers or registries; however, in other embodiments, the instant messaging or other communication functionality may be implemented centrally with a single dnode, a subset of dnodes or a dedicated messaging server or servers.

The "Client Application" shown in FIG. 1 may also be referred to using the more general phrase "Service Consumer," in that it is a consumer of the services offered by the VMPS system.

A. 1. Message-Centric Feature Set

The VMPS system, in one embodiment, is message-centric. Of course, the VMPS system can be used to store any digital data contained in a message or series of messages, rendering the system particularly useful in storing and persisting messages containing BLOBs or other digital objects. That is, the records stored in the distributed repository nodes 30 comprise at least one message payload and at least one attribute used to index and identify the message payload(s). In one embodiment, the message payload or payloads are BLOBs or other data objects. In one embodiment, each record is associated with an auto-generated Globally Unique Identifier (GUID) that serves as the primary key for the record. GUIDs may also be used within inter-node messages to refer to other messages, where request/response pairings are required. Accordingly, in the VMPS system, the concept of what constitutes a record, in one embodiment, is much different than in a relational database. Specifically, rather than a collection of field values, the records stored by the VMPS system, in one embodiment, comprise message payloads, such as Binary Large Objects (BLOBs). In one embodiment, a record consists of one message payload, such as a BLOB. Accordingly, a result set containing N records, according to one embodiment, contains N BLOBs. Of course, in other embodiments, records can contain more than one message payload. For example, a plurality of message payloads may correspond to a single BLOB or other data record. For didactic purposes, Table 1 demonstrates the differences between relational and message-centric data repositories on the basic record-insertion use case.

TABLE 1

Record Insertion

| Relational | VMPS |
| --- | --- |
| 1. Client gathers collection of values to be assigned to the records' fields. | 1. Client gathers collection of data to be stored in repository. |
| 2. Client composes SQL insert statement mapping each field name to its assigned value. | 2. Client composes a BLOB containing the data (often using gzip or similar compression utility). |
| 3. Client passes SQL statement to a database engine. | 3. Client gathers a set of attributes used to identify BLOB. |
| 4. Database engine serves request. | 4. Client passes both the BLOB and the attribute values to the VMPS. |
| | 5. The VMPS serves the request. |

As Table 1 demonstrates, the two use cases are different in both a conceptual and practical sense. In the relational case, a client gathers a set of field values that define a record, while in the VMPS system, the client composes a BLOB that constitutes that record, along with a list of attribute values used to tag the record for subsequent retrieval operations.

The magnitude of the discrepancy becomes particularly evident when considering a scenario in which a data store contains extensive, detailed, and wide-ranging information pertaining to, for example, a company's work force. Hundreds of data points may be gathered on any given employee. If this information is stored in relational database, it will probably take the form of several (and perhaps many) different tables containing records associated by foreign keys. Persisting the data for a single employee could be accomplished using a sequence of insert statements (or equivalent stored procedure).

```
INSERT INTO emp_education (hs_name, edu_level, uni_name, ...
INSERT INTO emp_employ_hist (comp_name, length_of_emp, ...
INSERT INTO emp_main (first_name, last_name, emp_id, ...
```

In contrast, a VMPS client would create a BLOB, for example, containing the user's entire profile, and persist it to the VMPS repository system using a single statement:

```
INSERT INTO emp (first_name, last_name, emp_id),
    first name, last name,
    user_profile_blob_ref,...
```

All of the data that defines an employee profile would be placed in the BLOB, even values provided for attributes. For example, even though the employee's first name is provided as an attribute value in the INSERT, it must be placed in the BLOB because, generally, when the record is retrieved it is the BLOB that is provided to the client.

A.2. Indexes

The indexes maintained by the VMPS system, in one embodiment, are based on the attributes associated with the BLOBs. In one embodiment, an ascending index is automatically created by the VMPS system whenever a new attribute type is introduced. Additional indexes may be explicitly created in roughly the same manner as in a Relational Database Management System (RDBMS). Indexes may be implemented by a variety of data structures, such as binary trees, B-trees, hash tables, and the like.

A.3. Data Distribution

Data distribution among the dnodes 30 in a VMPS system, in one embodiment, is based on two principles:

1. Every dnode 30 in a VMPS system maintains all indexes associated with the data contained in the VMPS system. This has a number of operational implications. For instance, when an index is created or changed at a given dnode, this event is communicated to all other dnodes so that the indexes each dnode maintains can be updated as well.

2. Record content (the BLOBs or other data objects stored on insertion) will be disseminated among dnodes on an "as-needed" basis. That is, while a VMPS system might contain hundreds of dnodes 30, any given BLOB or other data object will generally be present on a much smaller subset of dnodes 30. If a dnode 30 is never asked to either insert or retrieve a particular record, it is possible the dnode 30 will never encounter and therefore persist that record. Once a dnode 30 receives a record, it will hold that record in memory (essentially caching it) for a (potentially lengthy) period of time, allowing the dnode 30 to serve requests for that record without again obtaining it from another dnode 30 in the VMPS system. In addition, if a dnode receives a request for a record not maintained by it locally, in one embodiment, it broadcasts a content fault to other dnodes in the VMPS system to identify a dnode that maintains a copy of the requested record and obtains a copy from one of the responding dnodes. In one embodiment, the original dnode also stores the copy after serving the request.

A.4. Content Replication

In one embodiment, the VMPS system features content replication to ensure availability and distribute the computational load associated with sharing content on demand across dnodes. As discussed above, all indexes are completely replicated-if there are N dnodes, then there will be a total of N instances of each index. The rules for content replication (e.g., message payloads, BLOBs, etc.) are, in one embodiment, more complex. As discussed above, in one embodiment, a dnode 30 receives and maintains in memory any record for which it receives a client request. However, this is not the only condition under which a dnode 30 may be called upon to store content.

In many cases a dnode receives and stores a record not because it has received a request for that record, but because of the need for replication. In the VMPS system, replication is the dissemination of duplicates of a record in order to ensure that record's availability, in case of dnode failures and other instances where content on a given dnode becomes temporarily or permanently unavailable. The rules governing replication, in one embodiment, are largely driven by the concept of a replication factor. A replication factor is a number indicating the minimum number of instances of a record that ought to be maintained by the VMPS system. If it is desirable for a particular record to be present on no less than three dnodes at any given point in time, then that record has a replication factor of three. The VMPS system strives to ensure that all records are duplicated to the degree required by their replication factors.

In one embodiment, the following procedure may be used to determine a record's replication factor:

1. Determine whether or not a default replication factor is designated in the system-wide configuration.

2. If no quantity is specified, the replication factor is "two."

3. If a default replication factor is present, set the record's replication factor to that value.

4. Determine whether or not any replication rules have been established. If any replication rules exist, apply each and set the replication factor to the highest resulting number.

In one embodiment, replication rules may take the form of a series of attribute-based assertions. For instance, the statement "If (attribute tablename)='emp_table'5" indicates that if a record's tablename is "emp_table," then it's replication factor should be no less than five. In one embodiment, replications rules are themselves replicated universally in the same manner as indexes.

A.5. Methods of Communication

A variety of mechanisms and functionality can be employed to establish and maintain communication between dnodes, and between dnodes and client nodes. In one embodiment, the common mode of communication among participants (dnodes and client nodes) in the VMPS system is SOAP/Jabber. Every VMPS client and every VMPS dnode in a system, in one embodiment, are Jabber clients, and every VMPS dnode possesses the ability to function as a Jabber server. However, in other embodiments, the Jabber server functionality may be implemented at a single dnode, a subset of dnodes, or at a dedicated server or servers separate from the dnodes. In addition, other instant or one-way messaging protocols and technologies can also be used. In one embodiment, all messaging between nodes is one-way, with any activities requiring a request/response interchange generating two independent messages (as opposed to the common SOAP/HTTP paradigm, which takes advantage of the inherently bidirectional nature of HTTP). Examples of some of the messaging occurring in a VMPS system are shown below (a node may consist of either a dnode or a VMPS client).

1. When a node is activated, it uses Jabber's presence feature set to advertise its availability to other nodes in the system.
2. When a node is deactivated, Jabber's presence feature serves to advertise the fact that it is absent from the system.
3. When a dnode experiences a content fault, it will inform all other dnodes that it requires a particular record or records. Such a message, in one embodiment, is referred to as a "content check."
4. When a dnode receives a content request, and has that content available, it will send a "content present" message to the dnode that advertised the need for that content.
5. When a dnode receives a "content present" message, it may then ask the publisher of that message for a replica of the identified content. It will accomplish this using a "content request" message. Where more than one dnode responds with a content present message, the dnode can base its selection on a variety of factors, such as load, proximity, and the like. In one embodiment, to assist in the selection, the responding dnodes include a load indicator in the content present message indicating the current operating load of the responding dnode. In one embodiment, the dnode transmits a content request message to the dnode having the smallest load.

As one skilled in the art will recognize, two-way messaging protocols, such as HTTP can also be used.

A.6. dnode Architecture

Figure 2:
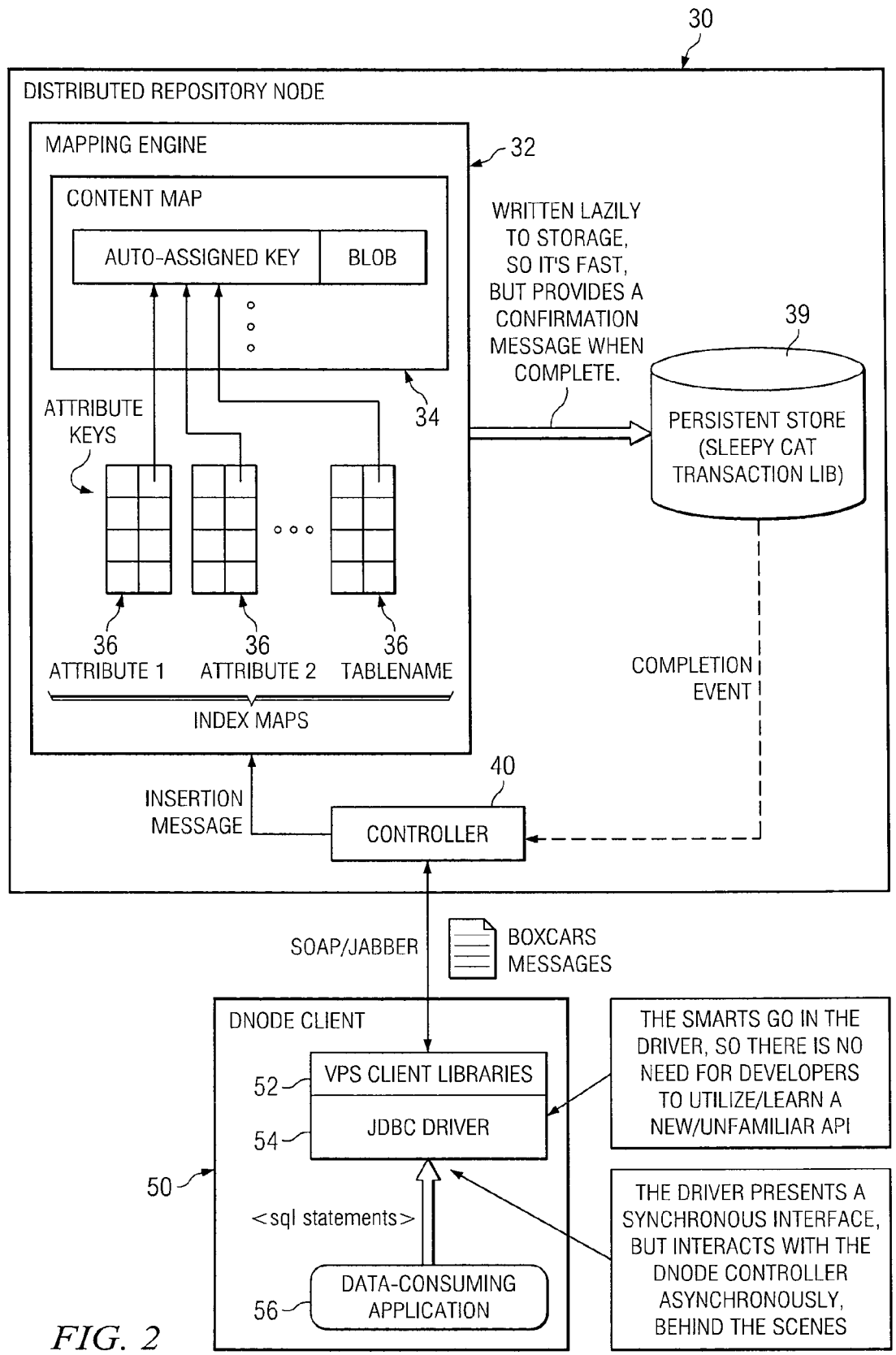
FIG. 2 is a functional block diagram providing certain components of a distributed data repository node according to an embodiment of the present invention.
Figure 4:
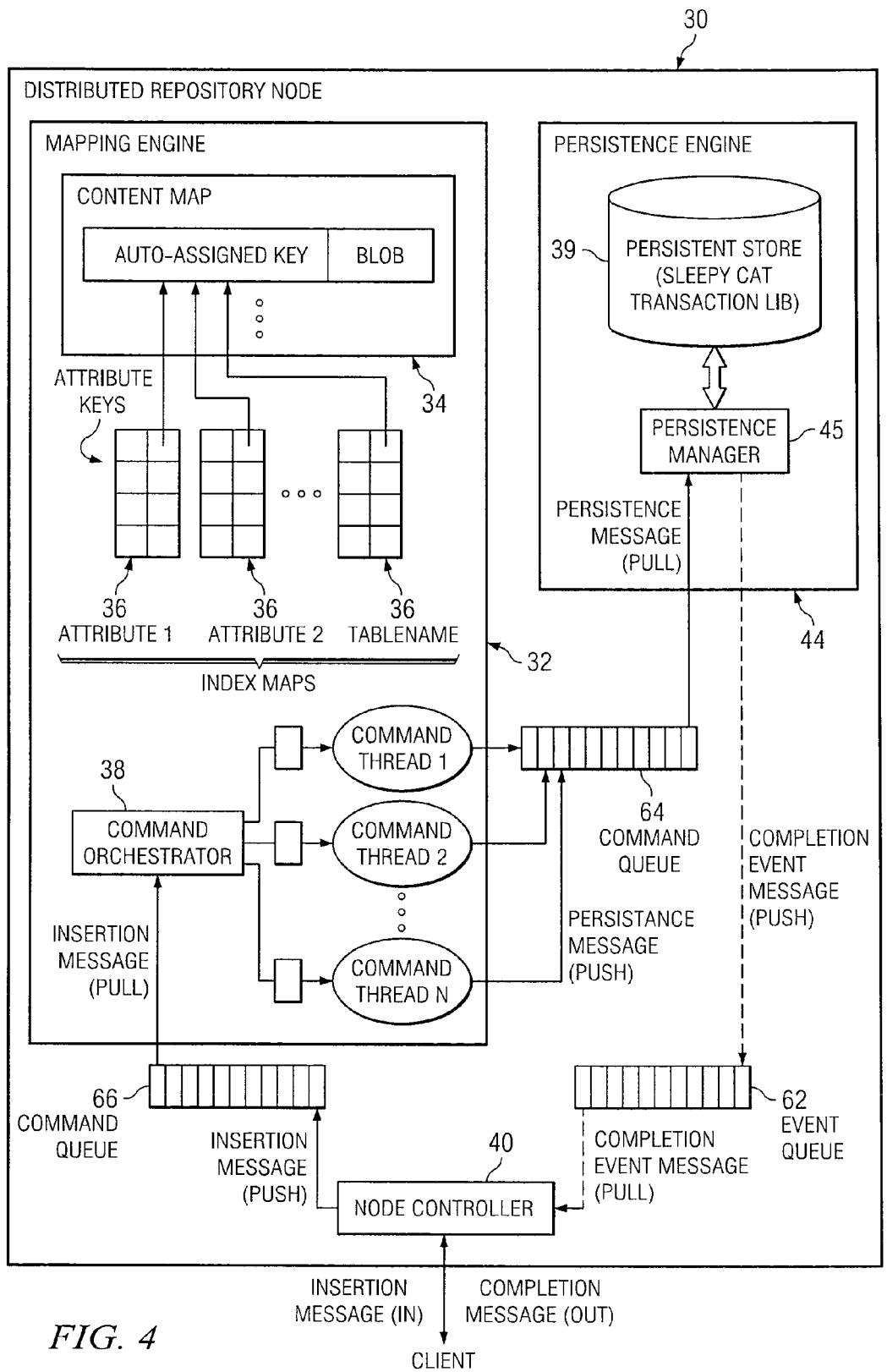
FIG. 4 is a functional block diagram providing a more detailed component break down of a distributed data repository node according to an embodiment of the present invention.
Figure 7:
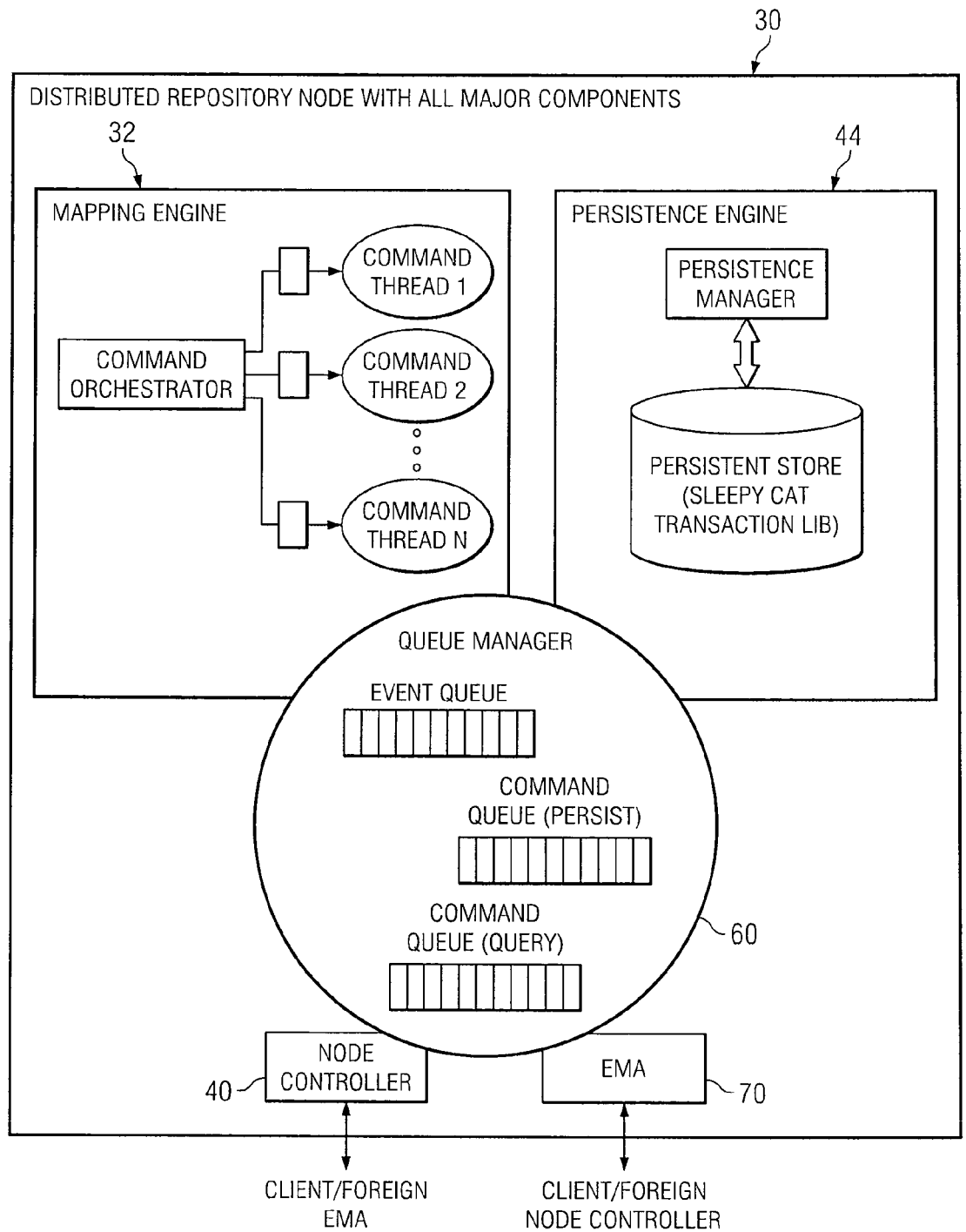
FIG. 7 is a functional block diagram showing the main components of a distributed data repository node according to an embodiment of the present invention.

FIG. 2 illustrates a high-level dnode architecture, according to an embodiment of the present invention, presenting some of the major components, certain data structures, functional modules, and data flows between the modules. FIG. 4 provides a more detailed diagram illustrating the major components comprising a dnode. As discussed in more detail below, the Queue Manager 60 is positioned such that it overlaps each of the other four components, representing the ability of those components to communicate asynchronously with one another through the Queue Manager. FIG. 7 provides another more detailed view of the dnode architecture. As FIG. 2 illustrates, the major architectural components and data structures, according to an embodiment of the present invention, includes mapping engine 32 comprising:

1. The Content Map 34 which, in one embodiment, is a (potentially immense) hash table. Each entry in the content map 34 contains one record, consisting of at least one BLOB or other message payload, and an auto-generated GUID that serves to uniquely identify that message payload.

Figure 3:
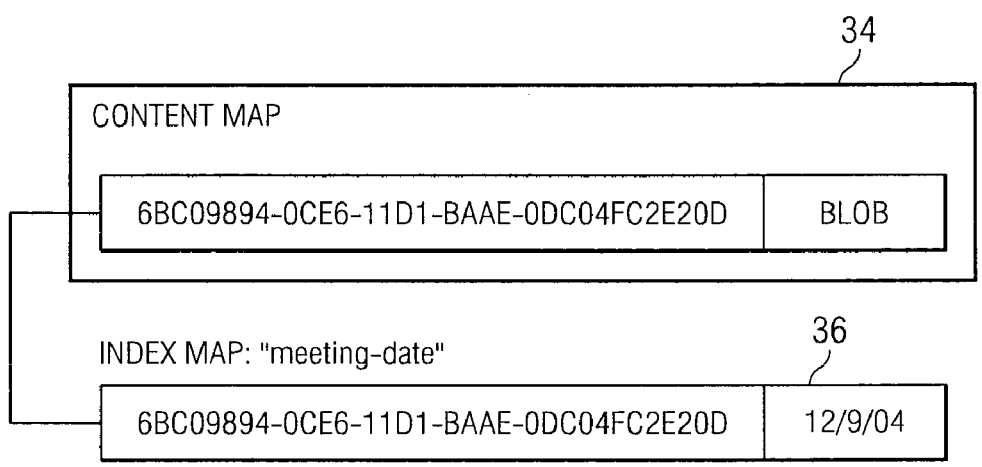
FIG. 3 is a block diagram illustrating the relationship between a content map and an index map.

2. An Index Map 36 provides the index for one particular attribute. Each entry in the index map 36 contains two values—an attribute value associated with a particular message payload and the GUID that points to that message payload. For example, consider a repository used to store sound recordings of meetings. Each meeting record consists of a BLOB that includes a digital voice recording of the entire meeting and various metadata such as a list of the participants involved. One of the attributes of that record is the date on which the meeting occurred. As FIG. 3 illustrates, the record is stored in a dnode's content map and assigned a GUID of, for example, "6BC09894-0CE6-11D1-BAAE-00C04FC2E20D." The date, "Dec. 9, 2004" is then placed in the "meeting-date" attribute index map and paired with the aforementioned GUID. As one skilled in the art will recognize, however, various optimizations are possible based on this basic scheme and that the data structures described herein are presented to illustrate the basic architectural strategies and should not be considered normative.

Physically, content map 34, as well as index map 36, is implemented in volatile memory, such as RAM, to speed record insertion and retrieval. The dnode 30 further includes persistent store module 39 and controller 40. The Persistent Store Module 39 is a local transactional repository that sits directly above the dnode's file system. Whenever the dnode's content map 34 or index map(s) 36 are updated or appended, the persistent store module 39 writes the new or updated records to disk, tape, or other persistent memory. Upon completion, the Persistent Store Module 39 generates an appropriate event message and dispatches it to the Controller 40. The Controller 40, in one embodiment, manages the interface between dnode client(s) and the internal components of the dnode. In one embodiment, the controller 40 continually shuttles messages between the dnode's input queue and the operational queues maintained by the Mapping Engine 32 (see below). In one embodiment, the controller 40 is also responsible for listening for and responding to events such as persistence completions so that it can generate appropriate messages for the VMPS client(s).

As FIG. 2 illustrates, the Mapping Engine 32 acts as a container for both the content map 34 and any index maps 36, and exposes a messaging API through which other dnode components can access those data structures. The Mapping Engine 32, in one embodiment, maintains the correctness and integrity of the relationships between the contents of all the various structures. In one embodiment, it is also the responsibility of the mapping engine 32 to initiate the persistence process, ensuring that all structures are written to disk in an expeditious manner. As FIG. 2 indicates, in one embodiment, data is written lazily to persistent store module 39 to enhance the speed and efficiency of the operation of dnode 30.

A.7. Client-Side Functionality

As depicted in FIG. 2, the dnode Client 50 represents any computer or computing device that hosts an application that makes use of the VMPS system. In one embodiment, a dnode client 50 may comprise VMPS Client 52 that functions in much the same way as a conventional RDBMS client. The VMPS client 52, in one embodiment, is an application that executes in a process local to the service consumer and that provides programmatic access to the VMPS system. As FIG. 2 illustrates, dnode client 50 may further comprise a database connectivity driver 54 (such as a Java Database Connectivity (JDBC) driver) allowing legacy data-consuming applications, generally using SQL statements to use the VMPS system without modification of the legacy application. That is, the connectivity driver 54, in one embodiment, presents a synchronous SQL interface to the data-consuming application 56 and interacts with VMPS client 52. The VMPS client 52, in one embodiment, interacts with a dnode using SOAP or other suitable protocol over an asynchronous general use messaging protocol, such as Jabber. As one skilled in the art will recognize, data-consuming applications 56 can be configured to interact directly with VMPS client 52.

In one embodiment, the VMPS client 52 is itself a sophisticated piece of software with a wide range of functionality. For instance, VMPS client 52, in one embodiment, 1) uses Jabber presence awareness to maintain a list of all available dnodes (for load balancing and fail-over purposes); 2) decomposes SQL statements fed it by the VMPS JDBC Driver into the SOAP messages understood by dnodes; and 3) mediates between the synchronous interface exposed to the JDBC driver and the asynchronous, message-driven interface exposed by the Node Controller 40. The VMPS JDBC Driver 52 exposes a JDBC interface through which the VMPS Client may be accessed. In one embodiment, the connectivity driver 52 converts SQL statements generated by the consuming application 56 into XML documents.

B. Message Processing Architecture

The architecture of the VMPS system, in one embodiment, is message-oriented. This means that the various internal components of the dnodes and, more generally, the dnodes in the VMPS system work together not by directly invoking methods on one another, but by passing messages in a queued, asynchronous manner. Of course, other messaging architectures can be implemented. In one embodiment, there are three different types of messages passed within the VMPS system:

1. Inter-Component (intra-dnode) messages, or messages passed within a particular dnode from one component to another. Inter-component messages are often used to signal the occurrence of discrete events, such as the completion of some task (e.g., completion of storing data object in persistent data store, etc.);

2. Inter-DNode messages, which pass between dnodes, enabling them to coordinate their activities and make use of services provided by one another; and 3. VMPS messages, which pass between VMPS clients and dnodes. These messages, in one embodiment, take the form of requests to use the services provided by the VMPS, and the responses spawned by those requests.

Because messages are processed asynchronously in one embodiment, each dnode maintains a number of queues to accommodate these messages. See below.

B.1. Inter-Component (intra-dnode) Messaging

FIG. 4 illustrates the dnode architecture, according to an embodiment of the present invention, at a lower, more detailed level. The core processing capabilities of a dnode, in one embodiment, are shared among three high-level components—the Node Controller 40, the Mapping Engine 32, and the Persistence Engine 44. A fourth component, the Queue Manager 60 (see FIGS. 5 and 7), handles distribution of messages among the other components. That, in one embodiment, all inter-component messaging is queued allows each dnode component to be loosely coupled with the others, with message exchanges occurring in an efficient, asynchronous manner. For example, the Node Controller 40 does not wait on the Mapping Engine 32 to accomplish any given task (at least, not directly). Instead, the Node Controller 40 invokes the Queue Manager 60 to dispatch a message describing that task (or command) and proceeds to another operation, leaving it to the Queue Manager 60 to see that the command is delivered to the component responsible for executing it, and that any relevant response messages are delivered to the Node Controller 40 in the same fashion. FIG. 4 provides a graphical representation of the interactions between the components of the dnode, according to an embodiment of the present invention. The contents of the diagram reflect consideration of the INSERT use case, and for this reason a number of message flows in FIG. 4 are labeled "insertion."

Figure 5:
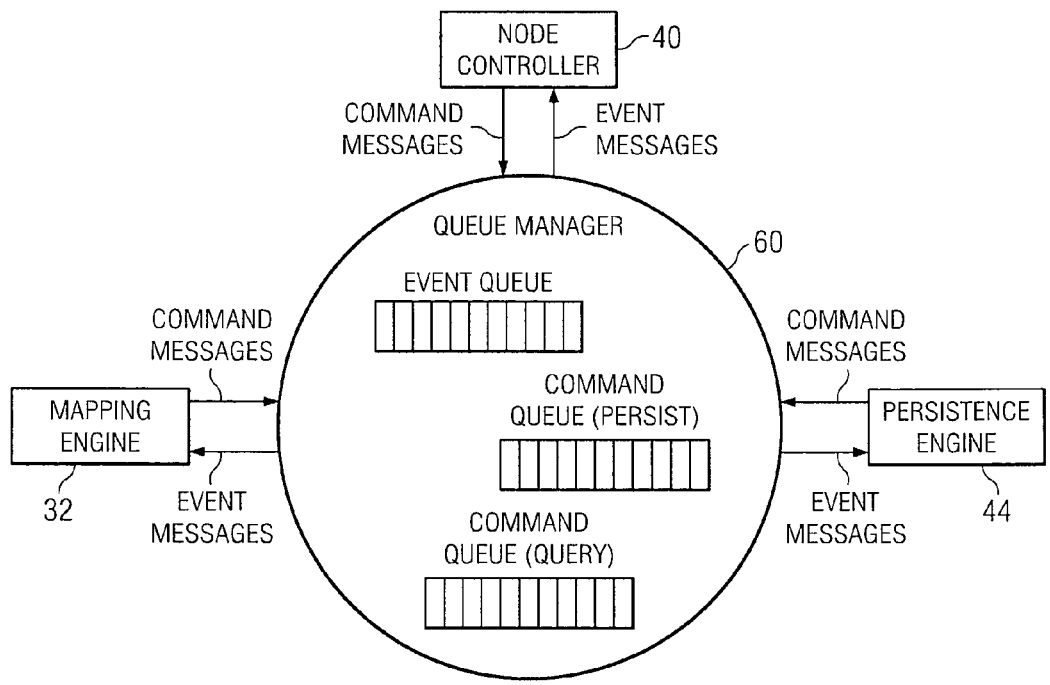
FIG. 5 is a functional block diagram illustrating the queued message flow in a distributed data repository node.

As FIGS. 4 and 5 illustrate, the dnode 30 includes a number of logical queues (three of which are shown in FIG. 4), such as event queue 62, persist command queue 64, and query command queue 66. Although separate queue data structures are shown, in other embodiments, these queues can be encapsulated in a single data structure. Each high-level component requiring the ability to process messages, in one embodiment, registers with the Queue Manager 60, informing it of the message types the component can process. The Queue Manager 60 ensures that all messages of that type are delivered to that registered component. While FIG. 4 labels message flows from queues to components with the word "pull," this is not strictly accurate according to one embodiment. All messages are transferred from a queue to a registered component by the Queue Manager 60—the dnode component does not literally pull the message from the queue, it merely registers the ability to process the message type with the Queue Manager 60. However, in other embodiments, the registered component can pull messages from the corresponding queue maintained by queue manager 60.

FIG. 5 illustrates the message processing relationship between the Queue Manager 60 and the other main dnode components. In certain embodiments, one inter-component message (e.g., a command message) may spawn several other messages (such as event messages); that is, there is not necessarily a one-to-one relationship numerically between a first message and a responsive message. For instance, if the Node Controller 40 issues a SELECT command that matches a large number of records, the contents of those records may be supplied to the Node Controller 40 using several event messages, each one of which provides some subset of the records matching the criteria specified in the SELECT command. If a record's content is particularly voluminous (such as a very large BLOB), it may require multiple event messages to provide the content to the Node Controller 40.

B.2. Inter-DNode Messaging

Messaging between dnodes 30 is very similar to that which takes place between the internal components of a dnode. Inter-DNode messages may, for example, be content fault messages broadcast to other dnodes asking for a given record not stored locally, as well as content present and content request messages (see above). In one embodiment, inter-dnode messaging uses SOAP/Jabber protocols and functionality. The basic concepts, in one embodiment, are essentially the same—one dnode requests activities on the part of another by dispatching an asynchronous, one-way "control message." Depending on the behaviors associated with the control message, one or more "event messages" may be transmitted to the dnode module making the request. There are, however, certain differences, according to an embodiment of the present invention, between inter- and intra-dnode messaging: 1) Inter-dnode messaging makes use of network protocols (e.g., SOAP/Jabber, HTTP, etc.); 2) Inter-dnode messages are encoded as XML documents; and 3) The recipients of inter-dnode messages must be explicitly specified, rather than implicitly specified through registration (though once a message arrives at a dnode, its delivery within that dnode will be based on registration with the queue manager).

Within the confines of any given dnode, a major processing component, such as Mapping Engine 32 or Persistence Engine 44, as discussed above, registers to receive a particular message type or types. For instance, the Persistence Manager 45 of Persistence Engine 44 registers as the "owner" of the "save-record-contents" message on startup, and will be the sole recipient of messages of that type, as transmitted by queue manager 60. On the other hand, the inter-dnode messaging system proceeds according to network-based addressing schemes and protocols. Instead, a dnode requiring the services of another dnode must pass the necessary messages to that dnode explicitly, using an IP or other computer network address.

Figure 6:
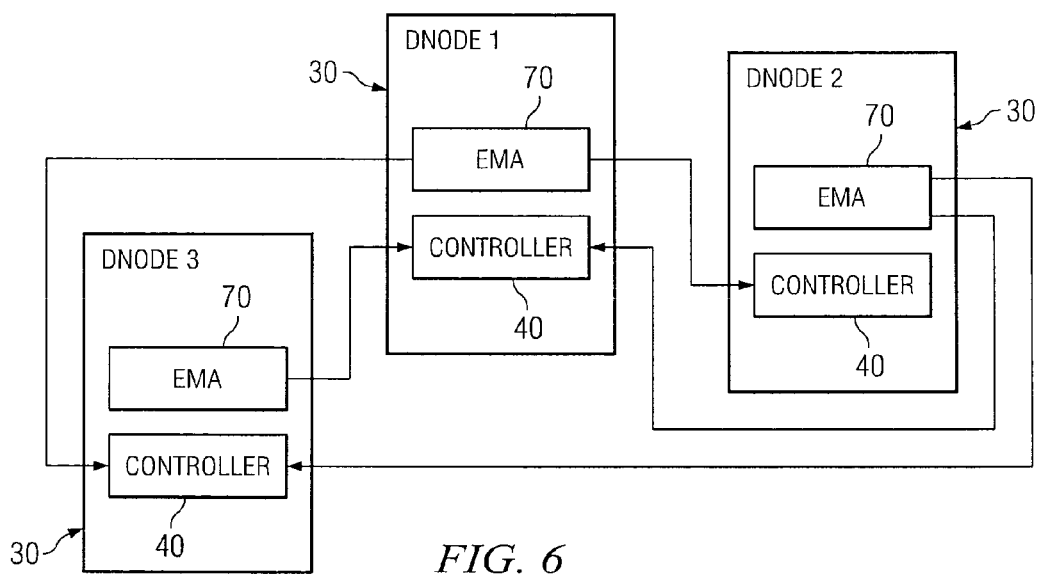
FIG. 6 is a functional block diagram illustrating the inter-dnode message flow in a distributed data repository system according to an embodiment of the present invention.

In one embodiment, the inter-dnode messaging functionality resides in a dedicated component of dnode 30—in one embodiment, External Messaging Agent (EMA) 70 (See FIG. 6). In one embodiment, the external messaging agent 70 is operative to initiate communications with other dnodes in the VMPS system. In one embodiment, the external messaging agent 70 1) tracks the on-line presence of other dnodes in the VMPS system (in one embodiment, using Jabber's presence feature); 2) dispatches command messages to other dnodes in the VMPS system; 3) handles fail-over conditions should a given dnode become unavailable; and 4) maintains a profile of relevant data concerning each dnode in the VMPS system (such as which dnodes are known to have which records); and 5) executes load-balancing algorithms, where appropriate. FIG. 6 also shows several possible message flow relationships in a simple, three-dnode VMPS system. As FIG. 6 shows, in one embodiment, both messages initiated by VMPS clients and messages initiated by EMA instances 70 are handled by the same functional module-Node Controller 40.

B.3. VMPS Messaging

As discussed above, VMPS messages are messages transmitted between dnodes and VMPS clients. In one embodiment, VMPS messaging uses SOAP/Jabber protocols and functionality. Other suitable communication and message protocols can be used, such as two-way protocols (e.g., HTTP), or other one-way messaging protocols. In many cases, messages issued by VMPS clients substantially similar to those generated by EMAs 70 and transmitted to other dnodes 30. For instance, assume for didactic purposes that a VMPS client needs to obtain records containing the scanned images of the signature pages signed by one "Sally Jones." The VMPS client 52 determines that dnode 2 is present (in one embodiment, using Jabber's presence feature) and sends a SELECT command to dnode 2. In the didactic example, however, dnode 2 does not have a copy of the required record. It determines that dnode 3 does have that record, and sends it a SELECT command. The initial SELECT command message sent to dnode 2 by the client and the subsequent SELECT message sent to dnode 3 by dnode 2 are essentially the same—that is, dnode 3, in one embodiment, responds to either message in the same manner. Dnode 2 receives the content from dnode 3 and serves the record to the requesting client node.

Table 2 sets forth a subset of possible message types in the VMPS system, according to an embodiment of the present invention.

TABLE 2

VMPS System Messages

| Name | Purpose | Processed By | Initiated By |
| --- | --- | --- | --- |
| select | Encapsulates SELECT command, parameters include filter and sort order. | Mapping Engine | Node Controller (Client) |
| insert | Encapsulates INSERT command, parameters include tablename and other name/value attribute pairs. | Mapping Engine | Node Controller (Client) |
| obtain-guid | Generates a GUID for use as a record key and ensures that it is reserved for use throughout the system as a whole. | Mapping Engine | Node Controller (Client) |
| guid-generated-event | Indicates that a GUID has been generated, but not yet been reserved. | EMA | Mapping Engine |
| reserve-guid | Informs a dnode that another dnode wishes to reserve a GUID. | Mapping Engine | Node Controller (EMA) |
| guid-reserved-resp | Informs a dnode that another dnode has either (a) already reserved a GUID or (b) not reserved that GUID, and recorded the fact that the GUID has been reserved. This message is generated in response to a "reserve-guid" message. | EMA | Node Controller (Mapping Engine) |
| guid-reserved-event | Indicates that a GUID has successfully been reserved. | Mapping Engine | EMA |
| obtain-guid-resp | Provides a new GUID, guaranteed to be unique, and reserved for some extended period of time. | Client | Mapping Engine |
| add-record | Add a record that has already been persisted on another dnode to the dnode's store. Parameters include all attribute name/value pairs and new record's GUID. One of the parameters is a Boolean that can be toggled to "false" if the records content will not be included (replicate index map entries only). | Mapping Engine | Node Controller (EMA) |
| update | Encapsulates UPDATE command, parameters include attributes to match. | Mapping Engine | Node Controller (Client) |
| content-update | Revise a record's content. Parameter consists of a GUID. | Mapping Engine | Node Controller (EMA) |
| delete | Encapsulates DELETE command, parameters include filter. | Mapping Engine | Node Controller (Client) |
| drop-record | Remove a record, specified by GUID. | Mapping Engine | Node Controller (EMA) |

TABLE 2-continued

VMPS System Messages

| Name | Purpose | Processed By | Initiated By |
| --- | --- | --- | --- |
| content-check | Used by a dnode to determine which other dnodes store a particular record. Parameter consists of a list of GUIDs. | Mapping Engine | Node Controller (EMA) |
| content-present-event | Used to signal presence of a particular record to other dnodes in the system. | Node Controller (EMA) | Mapping Engine |
| content-fetch | Request a record by GUID. | Mapping Engine | Node Controller (EMA) |
| content-fault | Indicates that a record's contents are present in the dnode's index map(s), but not its content map. | EMA | Mapping Engine |
| set-replication | Set replication level for by tablename. | Mapping Engine, EMA | Node Controller (Client), Node Controller (EMA), Mapping Engine |
| select-event | Signal that a select command has completed, parameters include quantity of matching records. | Node Controller (Client) | Mapping Engine |
| replication-complete-event | Signals that the replication process has been completed for a scenario. | Node Controller | EMA |
| insert-event | Signal that an insert command has completed. | Client | Node Controller |
| update-event | Signal that an update command has completed. | Client | Node Controller |
| delete-event | Signal that a delete command has completed. | Client | Node Controller |
| store-record | Store a record-parameters include attribute name/value pairs and reference to BLOB to store. | Persistence Engine | Mapping Engine |
| store-record-event | Signal that a record has successfully been stored in persistent memory. | EMA | Persistence Engine |
| store-attribute | Persists an attribute name/value pair | Persistence Engine | Mapping Engine |
| store-attribute-event | Indicates that an attribute name/value pair has been successfully persisted. | Mapping Engine | Persistence Engine |
| replicate-record-event | Indicate that a record has been successfully replicated to a remote dnode | Node Controller (EMA) | Persistence Engine |
| retrieve-record | Move a record from persistent storage into volatile memory. | Persistence Engine | Mapping Engine |
| change-record | Overwrite the persistent version of a record's content. | Persistence Engine | Mapping Engine |
| change-record-event | Signal that a record's content has been overwritten in persistent memory. | EMA, Node Controller (EMA) | Persistence Engine, EMA |
| chunk-received-event | Indicate that a record chunk (transmitted using the "content-record-chunk" message) has been received. | | |
| content-record-chunk | Transmit a record's content, or a portion thereof. | Node Controller (Client), Mapping Engine | Mapping Engine, Persistence Engine |
| remove | Drop a record, designated by GUID (used for synchronization) | Mapping Engine | Node Controller (Mapping Engine) |
| remove-event | Signal that a record has been complete removed from the dnode. | EMA | Persistence Engine |
| revise | Replace record's content, designated by GUID (used for synchronization) | Mapping Engine | Node Controller (Mapping Engine) |

TABLE 2-continued

VMPS System Messages

| Name | Purpose | Processed By | Initiated By |
| --- | --- | --- | --- |
| set-config-attributes | Used to set a dnode's configuration attributes. | Node Controller | Client, Node Controller |
| set-config-att-event | Acknowledges completion of a configuration change set in motion by a "set-config-attributes" command. | Client, Node Controller | Node Controller |
| build-index-map | Command a dnode to build a new index map. Parameter list includes list of attributes upon which the index map is to be based. | Mapping Engine | Client |
| build-index-map-event | Acknowledges completion of an index map build set in motion by a "build-indexmap" command. | Client, EMA | Mapping Engine |
| replicate-index-map | Exports the contents of an index map to dnodes other than the one on which the map was originally built. | Mapping Engine | EMA (Node Controller) |
| replicate-index-map-event | Acknowledges completion of an index map replication activity. | EMA | Mapping Engine (Node Controller) |

Table 2 is not a comprehensive list of message types; rather, it is merely a representative sampling of the message types supported by the architecture according to an embodiment of the present invention. Where messages of a particular type are initiated by the Node Controller 40 on behalf of another component, the Node Controller 40 is listed in parentheses. In addition, components located on a remote node are shown in boldface. For instance, Node Controller (Mapping Engine) indicates that the node controller 40 dispatches messages of that type after receiving them from a Mapping Engine 32 located on a remote dnode. In several instances, a message may be initiated by a local instance of a component or a remote instance of that component. Where this situation arises, the component name is listed twice, once normally and once in boldface. While some messages are not typically initiated by a client application, any message can be initiated by a client application.

C. Dnode Components and Architecture

C.1. The Mapping Engine

As described in the Overview, the Mapping Engine 32 handles the mapping of individual requests to a dnode's storage space, interacting with the Persistence Engine 44 as required. In one embodiment, mapping engine 32 includes Command Orchestrator 38, which manages the Mapping Engine's thread pool and assigns each command message it receives to one of the threads in that pool. When the Mapping Engine 32 encounters requests it is incapable of fulfilling using the records resident on that dnode (a "content fault"), it, in one embodiment, passes those requests along to the EMA 70 so that they may ultimately be fulfilled by other dnodes. Note that while the word "Engine" in Mapping Engine is used to describe this component, it does not necessarily constitute a distinct process at the level of the operating system (though it can be so implemented). Rather, the word "Engine" is used in this context because the Mapping Engine is a highly autonomous, non-trivially stateful software component that is loosely coupled to the other components in the system.

C.2. The Persistence Engine

The Persistence Engine 44, in one embodiment, balances the availability of individual records with the physical capacity of the dnode on which the VMPS runs. If, for example, a dnode is called upon to store three gigabytes worth of content but only has two gigabytes available for that purpose, then the Persistence Engine 44, in one embodiment, intelligently determines which records can be purged from volatile memory. The capabilities of the Persistence Engine 44 are exposed to the rest of the system through the Persistence Manager 45, which is fed command messages by the Queue Manager 60. The Persistence Manager 45 then interprets each command, interacting with the lower level components used to support persistence operations. In one embodiment, as with the Mapping Engine, the Persistence Engine 44 may or may not run in a dedicated, separate process.

D. Dnode Processes and Operation

D.1. Record Insertion Process

For purposes of illustrating operation of the dnode and its internal components, according to an embodiment of the present invention, the record insertion process is described in connection with BLOBs. Assume, for didactic purposes, that: A client application invokes the VMPS system to place a BLOB in the VMPS system. As discussed above, it transmits the content (BLOB) to a dnode, along with at least one name/value attribute pair associated with the BLOB. The dnode creates a record containing the content, associates it with the provided attribute value(s), and persists the record in the content map 34, and the attribute value(s) and a record identifier in the appropriate index map(s) 36. In addition, the dnode 30 retransmits the record to a number of other dnodes, ensuring that it is replicated according to an applicable replication factor.

The didactic example assumes direct use of SOAP APIs by client applications, rather than use of SQL in connection with the connectivity driver 52. Because use of SQL merely results in the VMPS Client generating the SOAP message, the algorithms involved are identical—use of SQL simply adds an additional level of indirection between the client application and the VMPS—a level of indirection provided by JDBC driver (see above) and the VMPS Client. In addition, the steps associated with record insertion correspond to the "primary flow" use case, in which no faults or complications occur. It is assumed that the insertion command to be processed targets only a single record (the multi-record insertion process is essentially the same, but requires additional verbiage). In one exemplary record insertion process flow:

1) VMPS Client obtains a GUID (GUID Provisioning Process)

a. A VMPS Client 52 sends an obtain-guid message to any dnode in the VMPS system.

b. The Mapping Engine generates a candidate GUID and places it in a guid-generated-event message, which it sends to the EMA 70.

c. The EMA 70 places the GUID in a reserve-guid message and sends it to all other dnodes associated with the VMPS system.
d. Each of the dnodes contacted in (c) responds by creating a guid-reserved-resp message and sending it to the dnode contacted in (a). Each dnode, in one embodiment, adds the supplied GUID to a list of reserved Ids for future reference.
e. The EMA 70 sends a guid-reserved-event message to the Mapping Engine 32, indicating that the desired GUID has been successfully reserved.
f. The Mapping Engine 32 places the GUID in an obtain-guid-resp message and sends it to the VMPS Client.

2) VMPS Client 52 composes an insert message, including within it a set of name/value attribute pairs with which the record to be created will be associated. One of the attributes included in the message can be "tablename." The client dispatches the message to the same dnode that supplied the GUID. The client also passes the GUID obtained in the GUID provisioning process, above, and, in one embodiment, the size (in bytes) of the content in the record to be inserted.

3) The Mapping Engine 32 receives the insert message dispatched by the VMPS client. In response, it begins the process of updating its index maps to reflect the values of the included attributes. It adds an entry to the content map 34, tags it with the specified GUID, and marks the entry's content as "pending."

4) The VMPS Client then transfers the content of the record it wishes to insert to the target dnode (Content Transmission Process).
a. In one embodiment, the content is divided into one or more "chunks," the size of which is governed by the VMPS system configuration.
b. The Client composes a content-record-chunk message for each of the chunks from (a), sending the messages to the target dnode. Each message contains the GUID generated in the GUID provisioning process and, in one embodiment, a number or other value indicating the proper order of the chunks for purposes of facilitating reassembly of the record at the dnode.
c. The Mapping Engine 32 receives each of the messages generated in (b), using them to reconstitute the contents of the record being transmitted. It sends a chunk-received-event message to the client in order to acknowledge receipt of each chunk.

5) Once the Mapping Engine 32 in the target dnode 30 receives the contents of the record to be inserted, it transfers those contents, in full, to the appropriate entry in the content map 34 (which it created in step 3).

6) The dnode then attempts to ensure that the new record (both its contents and attributes) is persisted (Record Persistence Process) in a persistent data store.
a. The Mapping Engine 32 composes a store-record message containing the GUID of the record to be persisted, along with its attributes, sending it to the Persistence Engine 44.
b. The Persistence Engine 44 begins the process of storing the target record in nonvolatile memory.
c. The Mapping Engine 32 transmits the content of the target record to the Persistence Engine (see Content Transmission Process). [In one embodiment, the architecture calls for the Mapping Engine 32 and the Persistence Engine 44 to be implemented as separate threads, not separate processes. In such an embodiment, the two components can share a common memory space, simplifying the content transmission process considerably.]
d. The Persistence Engine 44 persists the record's content, completing the Record Persistence Process.
e. The Persistence Engine 44 generates a store-record-event message, sending it to the EMA 70 in order to notify it of the fact that the target record was persisted.

7) The EMA 70, in one embodiment, then attempts to ensure that the new record's content has been properly replicated across the VMPS system (Content Replication Process).
a. The EMA 70 composes an add-record message and, in one embodiment, broadcasts it to another dnode associated with the VMPS system. The add-record message specifies the GUID of the target record, along with all of its attribute values. The EMA 70, in one embodiment, transmits the add-record message repeatedly (n−1) times where n is the target record's replication factor. The dnodes to which it sends these messages are referred to as "secondary nodes."
b. Each secondary node creates a new instance of the target record and begins the process of updating its index maps to include that record's attributes.
c. The EMA transmits the content of the target record to each secondary node. (Content Transmission Process)
d. Each secondary node adds the new record's content to its content map 34.
e. Each secondary node persists the target record (Record Persistence Process).
f. Upon completion of step (e), each secondary node's EMA composes a replicate-record-event message, dispatching it to the original target dnode.
g. Once the target dnode has received (n−1) replication event messages, it can be assured that content replication is complete.

8) The EMA 70 on the original target dnode 30, in one embodiment, then operates to ensure that the new record's index map entries have been replicated across all nodes in the system (Index Replication Process).
a. The EMA 70 composes a set of dnodes. This set includes all dnodes present in the VMPS system except the target dnode and the "secondary nodes" from step (7). The members of this set of dnodes will be referred to as the "tertiary nodes."
b. The EMA creates an add-record message with the "replicate content" parameter set to "false." The message is then dispatched to each tertiary node.
c. The tertiary nodes' Mapping Engines 32 update their index maps to reflect the attribute values listed in the message received in (b).
d. Each tertiary nodes' Mapping Engine 32 sends a store-attribute message to the Persistence Engine 44 in order to ensure that the contents of the new index map entries are persisted.
e. The tertiary nodes' Persistence Engines 44 send store-attribute-event messages to their local Mapping Engines 32 on completion.
f. Once persistence is complete, the Mapping Engines 32 issue replicate-record-event messages to the target dnode 30.
g. Once the target dnode 30 has received replication event messages from every tertiary node, it can be assured that index map replication is complete.

9) The EMA 70 packages the GUID of the target record in a replication-complete-event message and sends it to the Node Controller 40.

10) The Node Controller 40 discovers there is pending insert for the designated GUID and sends an insert-event message to the VMPS Client 52, indicating that the requested insertion command has been carried out.

Figure 8:
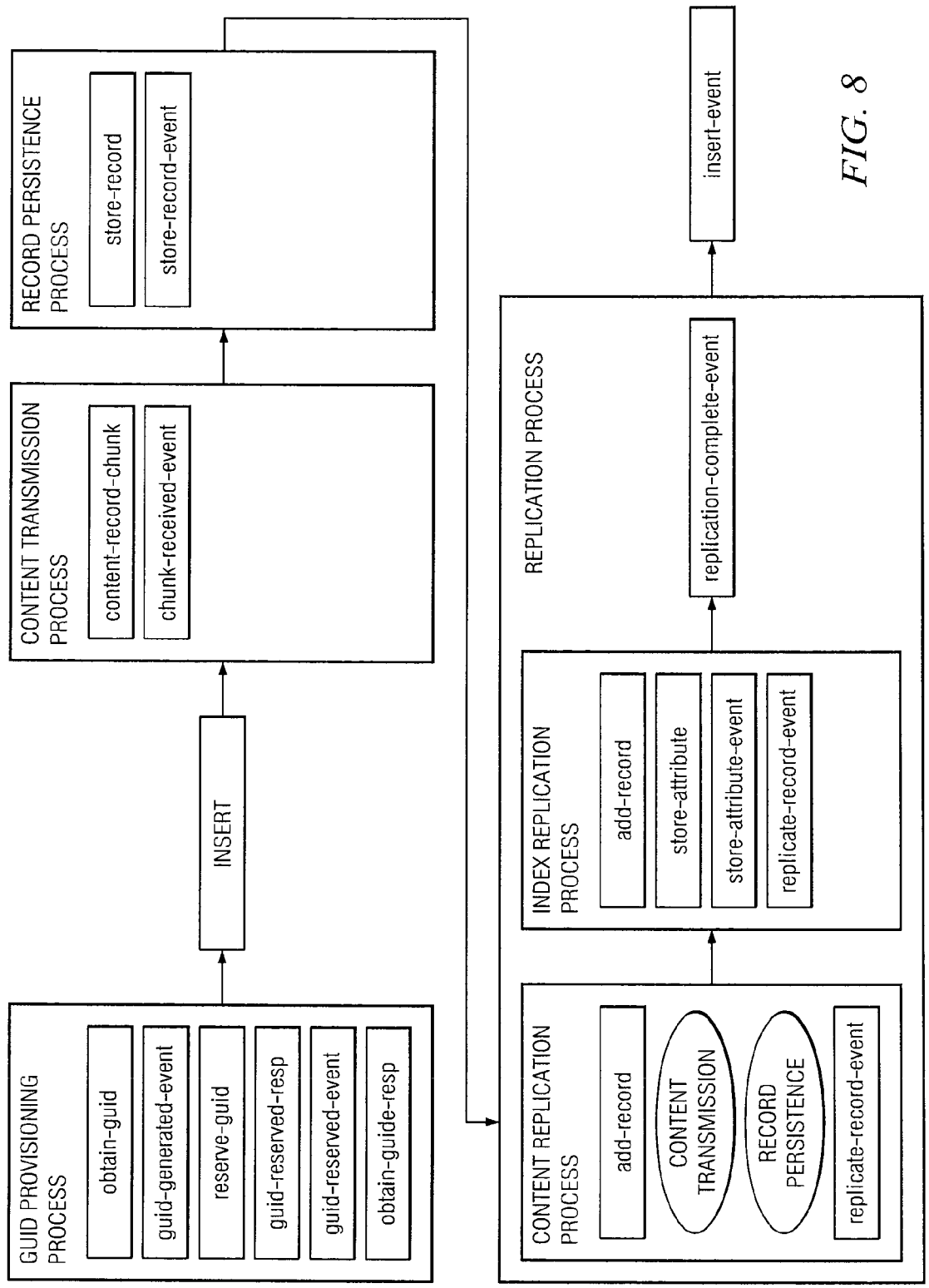
FIG. 8 is a diagram demonstrating the message types, according to an embodiment of the present invention, associated with the insertion of a data object in the distributed data repository system.

FIG. 8 lists the messages that take part in the insertion process, shown in the order in which they are processed (within each process top to bottom, with processes executed from left to right), according to an embodiment of the present invention. Note that because there is a great deal of parallelism in the architecture, the actual ordering of events is somewhat nondeterministic. In addition, one skilled in the art will recognize that myriad variations of the record insertion process described above are possible. For example, depending on the nature of the GUID generation algorithm, the GUID provisioning process may be more abbreviated than the one shown above. Some GUID generators produce values that are guaranteed to be globally unique, making reservation of the resulting values unnecessary.

D.2. Storage Management

Figure 9:
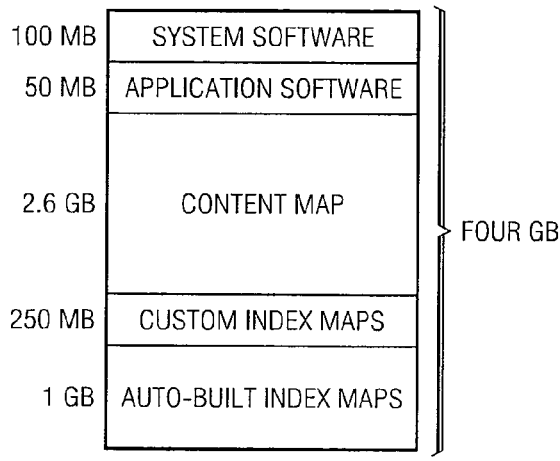
FIG. 9 is a diagram illustrating the division of volatile memory space, according to an embodiment of the present invention, for various functions of a distributed data repository node.

As discussed above, each dnode 30 in the VMPS system, in one embodiment, is equipped with application-specific memory management capabilities that respond to the specific content needs and usage patterns of clients. Each dnode includes a given amount of volatile memory space (such as RAM). For didactic purposes assume that each dnode 30 includes 4 gigabytes of RAM. FIG. 9 depicts the manner in which this memory is allocated according to an embodiment of the present invention. In certain embodiments, actual allocations may vary from dnode to dnode depending on a variety of factors. A dnode's volatile memory space, in one embodiment, is divided into five segments, portrayed as vertically stacked blocks in FIG. 9. In one embodiment, the contents of four of the five segments (all except the content map) are, in one embodiment, essentially fixed. To achieve high performance, the dnodes, in one embodiment, keep the following in volatile memory at all times: 1) the core system processes, 2) the VMPS application itself, and 3) all index maps. Accordingly, in one embodiment, the only degree of freedom present in the memory system of the dnode involves the content map. For the VMPS system, memory management essentially involves a process that controls which entries in a content map 34 are present in volatile memory at any given point in time. In one embodiment, this process balances the following concerns:

1. The content map 34, in one embodiment, should not be allowed to grow so large that index maps 36 or application processes are swapped out of volatile memory. In the exemplary memory space configuration depicted in FIG. 9, the ceiling on the amount of volatile memory dedicated to the content map is 2.6 GB.

2. A large enough portion of the content map 34 should be held in volatile memory to prevent frequent swapping of content map entries. Sufficiency of memory in this regard depends on specific usage scenarios. For example, if a dnode's clients only access a single content record (or small subset), over and over again, then the only portion of the content map that needs to be kept in volatile memory is that one record or subset of records.

In one embodiment, these goals are achieved based on a Least-Recently-Used (LRU) algorithm.

In one embodiment, this LRU-based approach operates as follows:

(1) In one embodiment, the dnode adds a property to each entry in the content map that contains a "last-time-used" timestamp.

(2) Each time a content map entry is accessed, the timestamp is updated with the current date and time.

(3) Every time an entry needs to be added to the content map, the mapping engine 32 determines whether adding the entry would cause the content map's size to surpass the designated ceiling (in the exemplary embodiment 2.6 GB). If this is the case, then one of the current entries in the content map 34 must be dropped from the table before the new entry can be added. The entry with the least recent "last-time-used" timestamp is selected.

(4) The mapping engine 32 then drops the least recently used record from volatile memory.

(5) The mapping engine 32 then adds the new entry to the content map 32 in volatile memory.

D.3. Connection Management

In embodiments where dnodes use Jabber or other one-way messaging protocols, connection management is important because communications between the dnodes in such a system are not based on intermittent connections, created on demand (as with HTTP), but on dedicated connections. Though dnodes, in one embodiment, communicate with one another using instant messaging functionality (via the Jabber protocol), the dnodes, in one embodiment, do not do so using an intermediary server, like conventional IM clients. [However, in other embodiments of the present invention this is certainly possible.] Instead, the dnodes, in one embodiment, form dedicated connections with each other, in one embodiment, forming a fully connected graph.

In one embodiment, each dnode is also a Jabber (or other one-way messaging) server. If the number of dnodes is small, this goal is easily accomplished—there should be no problems with a dnode maintaining persistent connections with, for example, ten other dnodes. Problems potentially arise, however, in very large deployments that include hundreds or thousands of dnodes. At some point, the number dnodes in the network will far exceed the number of connections any given dnode can efficiently maintain. However, in most deployment scenarios it is highly unlikely that any given dnode will require a problematically large number of connections to function efficiently at any given point in time. Generally speaking, a dnode may typically require use of (n+m+C) simultaneous connections, where n is largest replication factor of any record stored on that dnode, m is the current number of clients connected to that dnode, and C is some small (probably single-digit) constant. In a small to midsized deployment, one might expect to see a value in the neighborhood of (3+8+5)=16. While it might be ideal, in terms of worst-case latency minimization, for a dnode to maintain direct connections to each of the (perhaps hundreds) of other dnodes in the deployment, sixteen connections could very well suffice. In one embodiment, the connection management functionality employed by each dnode in the VMPS system operates to: 1) ensure that the number of connections generally does not fall below (n+m+C); and 2) ensure that the number of connections never rises above some explicitly configured threshold (probably set to some triple digit number). Obviously, it is possible to set "n" so high that fulfilling the first of these two goals becomes impossible, but such configuration errors are unlikely or preventable.

In one embodiment, just as with storage management, the connection management functionality of each dnode employs LRU-based methodologies. In one embodiment, one such approach can be summarized by the following operational principles.

(1) Form connections on demand. That is, dnodes do not determine the value of "n" and establish the commensurate number of network connections. Instead, each dnode waits until the time comes to actually dispatch replication messages, establishing connections as needed.

(2) "Age" connections. In one embodiment, each dnode assigns each connection a numerical score, adding to it each time the connection is used and subtracting from it whenever a set period of time (for example, one minute) passes without the connection being used. Once the score drops below 0, the connection is closed.

(3) Drop old connections. Drop any connection that has not been used for some period of time (24 hours, for example).

(4) Drop oldest connections as needed for new connections. If adding a new connection would push the number of connections over the pre-established limit, then the dnode drops the existing connection with the lowest score.

(5) Prioritize client connections over server connections. That is, in one embodiment, dnodes are configured to drop a connection with another dnode before dropping a connection established by a client application. In one embodiment, if the score associated with a client connection is lower than, but within a threshold range of, a dnode connection, the dnode connection is dropped rather than the client connection.

D.4. DNode Configuration

In one embodiment, configuration of the VMPS system is responsive to the distributed and symmetric VMPS architecture. Because there is no centralized management repository, there is no particular node to which a system administrator clearly must connect in order to accomplish configuration tasks. In one embodiment, configuration parameters are divided into two categories: 1) global parameters (applicable throughout an entire deployment), and 2) local parameters that apply only to particular dnode. Table 3 shown below provides a few examples of each.

TABLE 3

Configuration Parameters

| Global | Local |
|---|---|
| Default replication factor | Amount of RAM available for content map |
| Replication rules | Maximum allowable number of connections |
| Content chunk size | IP address for server connections |
| Default SOAP port | Port(s) for server connections |
| | Sibling addresses; addresses of one or more dnodes in same deployment ("sibling" nodes) |
| | Logical Name |
| | IP networking subnet mask |
| | X.509 Certificate |

Setting local configuration parameters is fairly straightforward—a parameter name/value pair is submitted to the dnode, which adjusts or establishes the appropriate parameter. Global parameters require a more involved configuration update process, because a global parameter applies to the VMPS system as a whole rather than any particular dnode. In one embodiment, the approach utilizes the same replication mechanisms used to maintain content in a decentralized manner. In one embodiment, a network administrator can set global configuration parameters using the same mechanism(s) used to set local parameters. However, because of their global nature, the values assigned to the parameters will be replicated across all dnodes in the system (in a process similar to updating index maps). In one embodiment, the configuration functionality includes configuration files and dedicated message types defined as part of the VMPS SOAP/Jabber interface. Other mechanisms, such as an HTML or SOAP/HTTP interface, can be used as well. Configuration files, in one embodiment, are XML documents read on startup. Dynamic configuration changes are made using the SOAP interface. The dnode, in one embodiment, persists any changes to a separate file known as its "secondary config doc."

D.5. DNode Initialization

The distributed nature of the VMPS system creates certain complications with respect to dnode initialization procedures. Chief among these is the fact that each dnode must "bootstrap" into the system, obtaining a complete list of the other available dnodes. In embodiments that use instant messaging functionality where there is no centralized server(s) that serve as directories containing all of the participants in the system, dnodes include a "sibling addresses" configuration property listed in Table 3, above. The values assigned to this property guarantee the ability of the various dnodes in a deployment to "find" one another and obtain operational information without the need to reference a central directory server.

In one embodiment, the dnode initialization procedure includes the following steps:

(1) Read contents of configuration file. Set all configuration properties accordingly.

(2) Read contents of secondary config doc (if one exists). Set all configuration properties accordingly.

(3) Build a list of the other dnodes in the system:
 (a) Add each sibling dnode listed in the configuration properties to the list.
 (b) Scan the local subnet for other dnodes, querying each IP on the subnet using the default SOAP port.
 (c) "Ask" every dnode currently on the list for a complete list of all dnodes on their respective lists. Each should response by sending a messaging containing the requested information to the target dnode.
 (d) Repeat step (c) until the target dnode's list of other dnodes stops expanding.
 (e) Write the complete list of dnode addresses to the "sibling addresses" property stored in the secondary config doc.

(4) Use Jabber to advertise the dnode's presence to other nodes in the system.

(5) Use Jabber to acquire a list of the other nodes present in the system.

In one embodiment, it is the responsibility of the system administrator to configure the network in such a way that it contains enough bootstrap information for all of the dnodes to "find" one another. In one embodiment, this is accomplished by placing all dnode addresses in the sibling address list of each dnode. In another embodiment, if all dnodes are on the same subnet or virtual subnet the sibling list may be omitted altogether. Steps (4) and (5) may seem a bit redundant considering the nature of the data gathered in step (3), but as can be readily recognized this is not the case. Step (3) allows dnodes to build a list of all dnodes that exist in the same VMPS deployment, while the purpose of step (5) is to determine which nodes are actually present (are available for use) at a particular point in time. Step (5) is also more general than (3) in that it discovers the presence of VMPS clients, not just dnodes. After the initialization process is complete, the newly initialized dnode may then request a current copy of all index maps.

E. Content-Based Queries

In one embodiment, the VMPS system provides a means of indexing and retrieving records that is based on the contents of the BLOB or other data object, as opposed to the attributes explicitly associated with the BLOB in the data record. In one embodiment, the VMPS system supports content-based filters (CBFs) and policy mechanisms that facilitate the content-based indexing and retrieval functionality described herein. In one embodiment, the content-based filters and policy mechanisms automatically distills content elements based on applicable CBFs and modifies the index maps as required by the contents of the BLOB or other stored data object. This functionality also allows for queries based on elements in addition to, or in lieu of, record attributes. Embodiments of the present invention can be further extended to provide policy-based query mechanism that fully specifies or modifies an original query based on application of one or more policies and content-based filters.

Embodiments of the VMPS system incorporating the content-based query functionality build on the concepts discussed above, but also involve changes or modifications to the record insertion and extraction processes discussed above. At record insertion, policy mechanisms and content-based filters determine how and what elements from data objects are extracted and how such extracted elements are indexed. Upon record retrieval, the policy mechanisms and content-based filters are employed to dynamically construct queries that retrieve records based on the contents of the BLOBs or other data objects. The approach of embodiments of the VMPS system to content-based filtering is unique in that search criteria are generally not explicitly and/or fully defined at the time a search command or query is issued by a client application. Instead, two layers of the VMPS system—a policy layer and a CBF layer—, operate on the original query to determine content-based filters applicable to the query and to modify and/or fully specify the query, based on applicable CBFs, used to locate the requested record(s).

For didactic purposes, assume the following hypothetical situation: Frisk Inc.'s sales department stores information concerning customer prospects as XML files with a target namespace of www.frisk.com/sales/prspct-ns, abbreviated "fsp." The sales department wants to be able to retrieve prospect records based on a combination of prospect name, corporate affiliation, and date of entry. These requirements may be formally stated to require three filter criteria for a content-based filter: 1) Prospect name, 2) Corporate affiliation, and 3) Date of entry. In this didactic example, there is a single CBF policy assertion: That is, the policy for applying these criteria is "Apply if a search occurs in the fsp namespace." Taken together, the CBF and the policy may be said to constitute "filter requirements." In order to fulfill the filter requirements for this example, the VMPS system must take the following steps whenever a search command is received:

(1) Determine whether or not the search being issued utilizes the fsp namespace. If so, the associated filter criteria must be applied.

(2) If execution of step (1) indicates that the aforementioned filter criteria are appropriate, apply them to the original query—obtain each record for which the prospect name, corporate affiliation, and date of entry match the parameters specified in the query.

Figure 10:
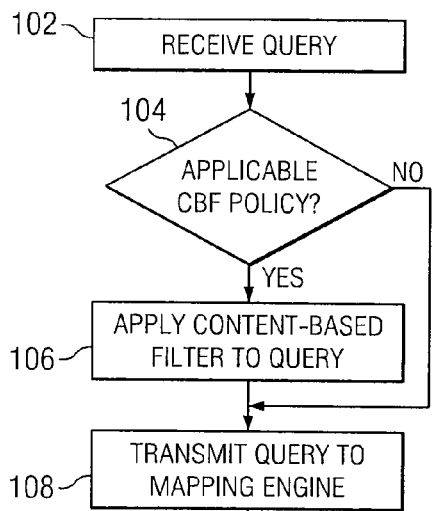
FIG. 10 is a flow chart diagram illustrating a method, according to an embodiment of the present invention, directed to the application of CBF and policy layers to a query or search command.

(3) Provide those records fulfilling the designated filter criteria to the requestor. FIG. 10 illustrates a method directed to operation of the CBF policy and CBF layers as applied to a query transmitted from a dnode client 50. In one embodiment, a dnode receives a query (102) and applies CBF policies to identify applicable content-based filters is (106). If application of the CBF policies indicates an applicable content-based filter, the dnode applies the content-based filter to the query (106), which is then transmitted to the mapping engine 32 (108) or the query command queue associated with the mapping engine 32. The mapping engine 32 locates all records corresponding to the modified query in the same manner as described above; that is, mapping engine 32 consults its indexes to identify the GUID(s) corresponding to the record(s) that satisfy the query and returns the records (and/or requests the records from other dnodes, if not stored locally) associated with the GUID(s). As one skilled in the art will recognize, application of the CBF policy and CBF layers can occur at various points in the dnode architecture. For example, node controller 40 can apply the CBF policy and CBF layers before transmitting the queries to mapping engine 32. In another embodiment, mapping engine 32 can be configured to apply the CBF policy and CBF layers to inbound queries.

E.1. Content-Based Filter (CBF) Definition

A content-based filter comprises one or more filter criterion. A filter criterion can, for example, define a mapping between an element in the original search command issued by the client application to the content-based element. A filter criterion may also add or modify an original search command to, for example, restrict access to records based on attributes of the dnode client, such as IP address or subnet, or even query attributes, such as time of day, etc. To define a filter criterion, one associates it with an extraction method that defines the method by which the element is accessed for a given record. For example, where queries are being made against content of MIME-type text/xml, extraction methods may be defined using XPath statements. To extend the previous example, the filter criteria, including extraction methods, can be defined as follows.

| Criteria | Extraction Method | Parameterized |
|---|---|---|
| Prospect Name | //pinfo/last-name/text( ) | Yes |
| Corporate Affiliation | //pinfo/company-name/text( ) | Yes |
| Date of Entry | //date-added/text( ) | Yes |

The most important benefit of this strategy lies in the fact that filter requirements may vary independently of the queries to which those requirements apply. Suppose, for instance, the fsp schema changes (once again, referring to the previous example), with "prospect name" being changed from a discrete XML element to an attribute of an XML element in the underlying XML documents. The filter criteria would then be updated as follows.

| Criteria | Extraction Method | Parameterized |
|---|---|---|
| Prospect Name | //pinfo/@lname | Yes |
| Corporate Affiliation | //pinfo/company-name/text( ) | Yes |
| Date of Entry | //date-added/text( ) | Yes |

A user could also change the prospect name criterion to include a prospect's first and last name.

| Criteria | Extraction Method | Parameterized |
|---|---|---|
| Prospect Name | concat(//pinfo/@lname, ",", //pinfo/@fname) | Yes |
| Corporate Affiliation | //pinfo/company-name/text( ) | Yes |
| Date of Entry | //date-added/text( ) | Yes |

This is an example of a change to a CBF that would require regeneration of indexes, since it would affect both new and previously entered records.

Because filter criteria can be updated in this manner the behavior of the queries used by client applications can be adjusted and enhanced without changing the queries themselves. Because all queries pass through the CBF layer, their behavior can be readily modified simply by editing the applicable CBF. Similar benefits are realized by allowing query policies to be dynamically updated. For example, suppose the sales organization needs to limit access to prospects entered by a particular branch office to applications deployed within that office (to, for example, prevent one branch office from poaching prospects of another branch office). For instance, if a prospect is entered into the system by the East coast branch, it should not be available to the Midwest branch. If one assumes the existence of different subnets for each branch—say, 192.168.1.* in the East and 192.168.2.* in the Midwest, the following policies can be configured:

| Policy Name | Condition | Logic | Matching | CBF |
|---|---|---|---|---|
| East Prospects | Namespace | AND | fsp | EP |
|  | Client Location | AND | 192.168.1.* |  |
| MW Prospects | Namespace | AND | fsp | MWP |
|  | Client Location | AND | 192.168.2.* |  |

So, according to this policy, the VMPS system applies the following policy to all queries: If a query designates the fsp namespace AND originates from 192.168.1.* apply the CBF named "EP" and if a query designates the fsp namespace AND originates from 192.168.2.* apply the CBF named "MWP." The corresponding CBFs, in one embodiment, can resemble the following:

|  | Extraction Method | Parameterized |
|---|---|---|
| EP Criteria |  |  |
| Prospect Name | concat(//pinfo/@lname, ",", //pinfo/@fname) | Yes |
| Corporate Affiliation | //pinfo/company-name/text( ) | Yes |
| Date of Entry | //date-added/text( ) | Yes |
| Region | //added-by/[region="Eastern"] | No |
| MWP Criteria |  |  |
| Prospect Name | concat(//pinfo/@lname, ",", //pinfo/@fname) | Yes |
| Corporate Affiliation | //pinfo/company-name/text( ) | Yes |
| Date of Entry | //date-added/text( ) | Yes |
| Region | //added-by/[region="Midwest"] | No |

Note that, for both CBFs, the "Region" criterion is not parameterized-meaning that it will not be compared and/or mapped to any search parameters provided as part of an original query. In this example, Region is not parameterized because it represents a constraint that is applied by the VMPS system rather than a means of allowing client applications to define queries. Rather, it is an additional criterion added to the query when determining which records satisfy the query. Such additional criteria may be based on the content of the record, attributes associated with record insertion, or other attributes, such as client IP address, subnet, time of day and the like. Furthermore, when the VMPS system attempts to extract (evaluates) the Region information upon record insertion, it determines is whether or not the result of that evaluation/extraction is non-empty. If it is non-empty the criterion is satisfied; on the other hand, if it is empty the criterion is not satisfied. The same approach can be used for matching against criteria that are defined as parameterized but for which no matching parameter is defined in a particular query. For instance, if a query is defined that does not provide a value for the "Corporate Affiliation" parameter, then the VMPS system produces matches for that criterion across all records that contain the "company-name" element, regardless of that element's value.

The following is an example of a search command that defines a content-based query.

```
<select>
    <namespace>www.frisk.com/sales/prspct-ns</namespace>
    <query-params>
        <query-param>
            <criterion-name>Prospect Name</criterion-name>
            <matching-value>Flintstone,Fred</matching-value>
        </query-param>
        <query-param>
            <criterion-name>Corporate Affiliation</criterion-name>
            <matching-value>Bedrock Corp.</matching-value>
        </query-param>
    </query-params>
</select>
```

Issuing this search command causes a dnode 30 in the VMPS system that receives the search command to apply CBF policies to identify the appropriate CBF(s), to modify the query as defined in the applicable CBFs, to consult the appropriate index map(s) to locate matching records, and to provide all records in the fsp namespace concerning a prospect Fred Flintstone of Bedrock Corp. Since no date of entry is supplied, the VMPS system does not restrict the result set to those records entered into the system on a specific date. In one embodiment, however, for a record to match it must contain a //date-added/element. Of course, other query modification rules can be specified for application of CBFs to queries.

In one embodiment, users define the content-based filtering behavior of the VMPS system by registering XML documents defining both CBFs and CBF policies. This is accomplished using the same messaging mechanisms used to establish other aspects of the global, cross-dnode configuration of the VMPS system (see Section D.4., supra). These documents are disseminated across all dnodes in a VMPS system deployment, allowing them to be applied on a system-wide basis. Furthermore, in order to ensure acceptable performance levels for content-based queries each dnode in the VMPS system automatically builds indexes for CBFs upon their respective registrations.

Accordingly, whenever a record is inserted at a dnode in the VMPS system, the dnode analyzes the record applying CBF policies to determine which CBF(s) apply to the record, parses the contents of the record applying the extraction methods associated with any applicable CBF criteria, and adds the extracted elements to the applicable index maps. This process results in entries being added to the appropriate index maps maintained by the dnode, as well as propagation of changes to the index maps maintained by other dnodes as discussed above (see Sections A.3., A.4. & D.1., supra). The implications for update and delete commands are similar—that is, the corresponding changes to the index maps are distributed to all dnodes in the VMPS system to maintain correct, up-to-date indexes. As has been previously noted, changes to CBFs and CBF policies may also require that each dnode in the VMPS system rebuild affected indexes. For example, if a CBF is modified to add an additional filter criterion, a corresponding index map must be created.

Figure 11:
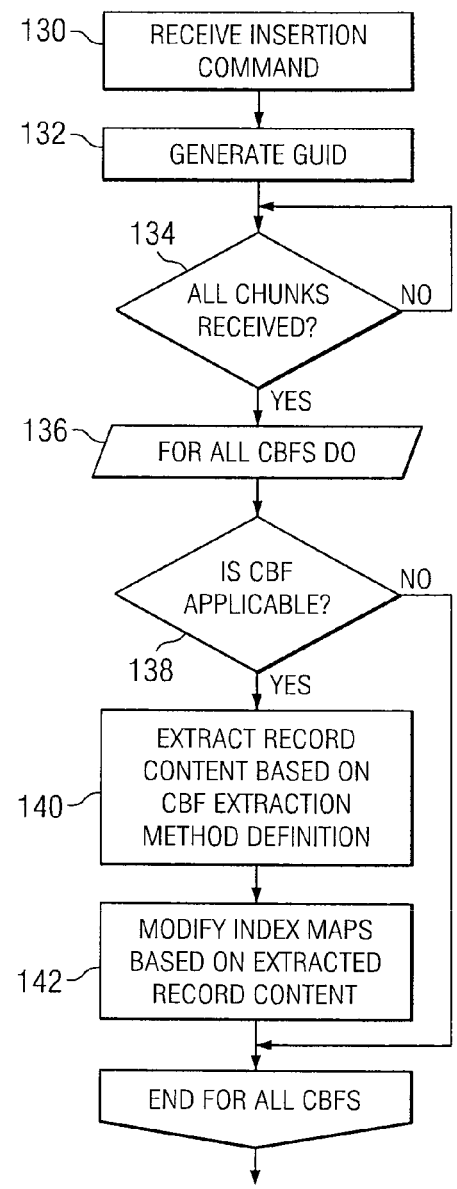
FIG. 11 is a flow chart diagram showing a method, according to an embodiment of the present invention, directed to application of CBF and policy layers to a record insertion command.

FIG. 11 provides a method directed to application of CBF policy and CBF layers to record insertion requests. As FIG. 11 illustrates, when a dnode receives a record insertion command from a dnode client 50 (130), it generates a GUID (see above) (132). When all record chunks are received (134), the dnode, for all CBFs (136), applies CBF policies to identify applicable CBFs (138). For example, a CBF policy may check to see whether the record contents is a given file type (e.g., text/XML, etc.), or is being saved to a particular name space. If a CBF is applicable, the dnode extracts the record content based on the extraction methods defined in the CBF (140) and modifies the appropriate index maps based on the extracted record content (142). Propagation of requisite changes to the index maps of other dnodes in the VMPS system, as well as Content Replication, occurs as discussed in previous sections. Record modification proceeds in a similar manner requiring re-application of a CBF to extract content elements and update the indexes as required.

In addition, while the examples described herein focus on use cases involving text/XML content, the invention has application to other document or file types beyond this single MIME-type. The content-based functionality of embodiments of the VMPS system can be extended to a variety document and file types. In addition to other structured document types (e.g., SGML, HTML, etc.), a few examples of systems supporting alternate document or file types, along with corresponding extraction methods, include:

1. A system that stores Word or other word processor documents, and provides full-text-search extraction methods;
2. A system that stores MP3 or other audio files, and provides extraction methods for searching on length, dynamic range, and the number of times the word a given word appears; and
3. A system that stores images, represented as DIBs, and provides extraction methods based on color-depth and image dimensions, and/or text recognition or image pattern recognition functionality.

In one embodiment, the VMPS system supports a number of CBF extraction methods, such as those required to support XML content, and provides a pluggable model allowing others to introduce other extraction methods for additional document or file types. In one embodiment, these extraction modules are callable using standard interfaces and invocation methods, such as SOAP/HTTP, SOAP/JMS, EJB, and Java local.

F. Continuous, Streaming Records

In one embodiment, the VMPS system includes a feature set that supports streaming content. In embodiments of the VMPS system described above, as in most data repositories, a record is generally thought of as a stable, discrete and static entity, changed only in response to specific events, such as updates and deletes. Embodiments of the VMPS system, however, provide a feature set that allows for record content to behave in a dynamic manner. Specifically, and in one embodiment, the VMPS system allows records to be classified as having "continuously-streaming-content" (CSC). The difference between a conventional record and a CSC record can be illustrated using the following, abbreviated description of the record insertion procedure described above, as implemented within the VMPS system:

1) A Client initiates insertion, and is provided with a GUID;
2) The Client provides a dnode with a series of content chunks, continuing until the record's content has been passed in its entirety;
3) The dnode supplies the Client with completion confirmation after it has completed all necessary tasks (persistence, replication, and so on);
4) Any Client that requires it may now retrieve the record. For CSC records, on the other hand, record content, transmitted in chunks, continues indefinitely; that is, there is essentially no concept of record completion. The CSC record does not have a fixed length—it is simply a data stream being cached and redistributed by dnodes in the VMPS system. The modified record insertion procedure includes the following steps:

1) Client initiates insertion, and is supplied with a GUID;
2) Client provides a dnode with a series of content chunks, continuing indefinitely;
3) The dnode persists and replicates each chunk as it arrives, ensuring that the record's content is immediately available for retrieval by Clients.

The dnode supplies the Client with a confirmation concerning processing of each chunk, but will never provide completion confirmation, because the process never officially completes. Clients may retrieve the record's content as soon as the first chunk is processed by the VMPS, and may continue to be send chunks associated with the record as long the inserting Client continues to supply them.

Similarly, the concept of content retrieval is fundamentally different for CSC records than it is for conventional records. By issuing a retrieval command, the Client essentially subscribes to the data stream(s) represented by the record(s) matching the search criteria designated in that command. In order to terminate this subscription, the Client will have to explicitly invoke a command used expressly for that purpose—e.g., "terminate-select." When a dnode receives such a command, it will stop streaming content associated with the specified record to the issuing Client. CSC records are also different from conventional records in that updates are not allowed-update commands issued for CSC records will cause a fault message to be sent to the issuing Client.

Figure 12:
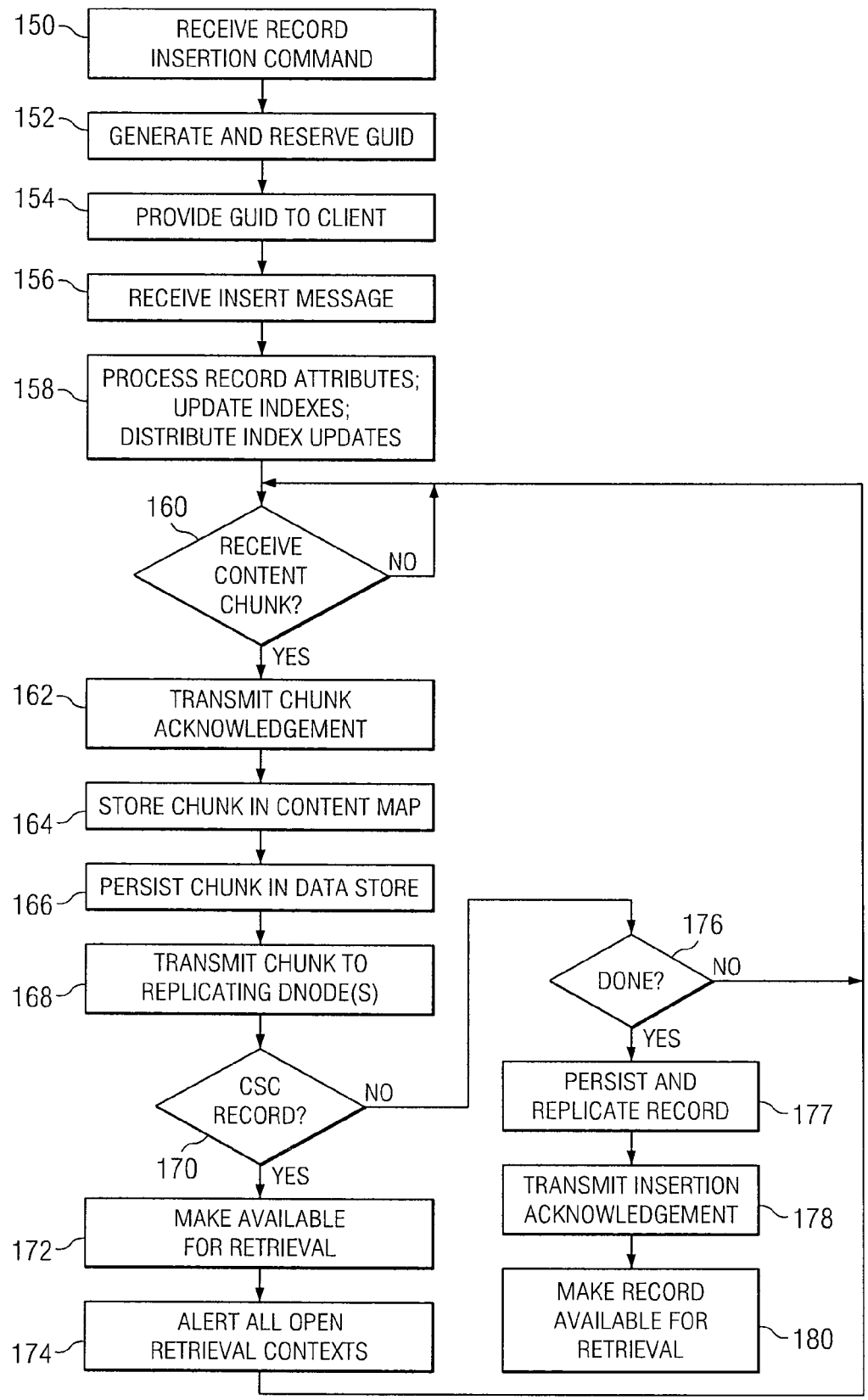
FIG. 12 is a flow chart diagram providing a method, according to an embodiment of the present invention, directed to insertion of a continuously-streaming-content (CSC) record.

As discussed above, a search/query command is placed on an appropriate command queue and a context or thread for the command is created. In the normal, finite record case, the context is opened, the search command satisfied, and the context is closed. In the CSC record case, the context of the retrieval command remains open. As FIG. 12 provides below, upon insertion of additional chunks associated with a given CSC record, the mapping engine 32 has access to all open contexts, including retrieval contexts, and makes the open retrieval contexts aware of the new chunk(s). The dormant retrieval contexts awake to provide the new chunks to the requesting dnode clients. Similarly, an insertion command is assigned a thread or context which is opened in response to the command. In the case of CSC records, the command context associated with record insertion remains open, allowing for addition of chunks in a continuous, on-demand manner, such as in a data stream, or on a periodic basis (e.g., hourly, daily, etc.) for as long as the insertion context remains open. Similarly, the record insertion context(s) spawned at other dnodes by the need for content replication across one or more dnodes also remains open as well.

FIG. 12 provides a method, according to an embodiment of the present invention, illustrating the process flow associated with insertion of continuously-streaming content records. Similar to the process flow set forth above in Section D.1., record insertion begins by receipt at a given dnode of a record insertion command (150) from a dnode client 50. The dnode generates a GUID and reserves the GUID with other dnodes in the VMPS system, transmitting a reserve-guid message to all other dnodes (152). The dnode then provides the GUID to the dnode client 50 (154) and receives an insert message (156) including the GUID and the attributes corresponding to the record. The dnode, in one embodiment, processes the record attributes, updates its index maps and distributes the index map updates to all other dnodes in the VMPS system (158).

As FIG. 12 illustrates, when the dnode client 50 begins to transmit content chunks (160), the dnode transmits chunk acknowledgment messages to the dnode client 50 (162). The dnode further stores each received chunk in its content map 34 in association with the corresponding GUID (164). The dnode, in one embodiment, further stores the received chunk in persistent memory (166) and transmits the received chunk to the dnodes selected for replication (168). If the record is a continuously-streaming-content (CSC) record (170), the dnode makes the received chunk available for retrieval (172) and alerts all open retrieval contexts of the new chunk (174). As discussed above, the dormant retrieval contexts awake and operate to transmit the received chunk to corresponding dnode clients. In this manner, content can be streamed to dnode clients 50 until the dnode clients transmit a "terminate-select" command.

If the record is not a CSC record (170), the dnode continues to receive content chunks until the aggregate bytes of the received content chunks equals the byte size indicated in the initial insert command, indicating that transmission of content chunks has ended (176). If so, the dnode, after performing the persistence and replication processes (177) discussed above in Section D.1., transmits an acknowledgment message to the dnode client 50 (178) and makes the record available for retrieval by other dnode clients.

The continuously-streaming-content functionality associated with embodiments of the present invention can be applied to achieve a variety of objectives. For example, the VMPS system may be deployed to create a "distributed TIVO" or on-demand streaming video system, wherein a CSC record represents the data stream for a particular television channel.

Lastly, although the present invention has been described as operating in connection with systems employing Jabber, XML, SOAP, HTTP, TCP and IP protocols, the present invention has application in computer network environments employing any suitable instant messaging functionality, as well as other Web services networking, session layer, transport layer and network layer protocols. Moreover, while embodiments of the present invention have primarily been described as operating in connection with a de-centralized instant messaging network architecture, the VMPS system of the present invention can be implemented in a centralized instant messaging network architecture. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. A distributed data repository node allowing for content-based data storage and retrieval, comprising
    a network interface operative to communicate with client nodes and at least one other distributed data repository node over a computer network, wherein client nodes transmit messages including message payloads;
    a content-based filter layer operative to
        receive the message payloads transmitted by the client nodes;
        apply at least one content-based filter to the message payloads received by the client nodes to extract one or more content attribute values corresponding to respective content attributes defined in the at least one content-based filter;
    a memory that stores a content map and at least one index map corresponding to an attribute; and
    a mapping module operative to
        receive, from the content-based filter layer, the message payloads and the extracted one or more content attribute values,
        store the message payloads received from the content-based filter layer in the content map in association with unique identifiers,
        store the one or more content attribute values associated with the message payloads received from the content-based filter layer in the at least one index map;
        synchronize the one or more content attribute values in the at least one index map with the at least one other distributed data repository node;
        receive a query including one or more attribute values each corresponding to a respective attribute;
        determine one or more unique identifiers for message payloads that match the query, the determining using one or more index maps associated with one or more attributes that correspond to the one or more attribute values;
        identify message payloads in the content map using the one or more unique identifiers; and
        return the identified message payloads in response to the query.

2. The distributed data repository node of claim 1 wherein the at least one content based filter includes at least one filter criterion specifying a content element and an extraction method defining extraction of the content element from the message payloads received by the client nodes.

3. The distributed data repository node of claim 2 wherein the content-based filter layer is further operative to
    receive a content-based filter including at least one content element and an extraction method defining extraction of the content element from the message payloads received by the client nodes;
    construct at least one index map based on the content elements and extraction methods defined in the content-based filter.

4. The distributed data repository node of claim 1 wherein the content-based filter layer is further operative to apply at least one policy to the message payloads received by the client nodes to select one or more content-based filters; and wherein application of the at least one content based filter is conditioned on selection of at least one content based filter.

5. The distributed data repository node of claim 1 wherein the mapping module is further operative to transfer the message payloads received from the content-based filter layer to at least one other distributed repository node for replication.

6. The distributed data repository node of claim 5 wherein the mapping module is further operative to receive message payloads from at least one other distributed repository node for replication, and store the message payloads in the content map in association with the unique identifier assigned by the other distributed repository node.

7. The distributed data repository node of claim 1 further comprising a persistent data store;

wherein the content map and the at least one index map are maintained in a volatile memory; and wherein the mapping module is further operative to maintain the message payloads received from the content-based filter layer and the at least one index map in the persistent data store.

8. The distributed data repository node of claim 1 wherein the content map and the at least one index map are maintained in a volatile memory; and further comprising a persistence module comprising a persistent data store and a persistence management module; wherein the persistence management module is operative to receive message payloads and attributes from the mapping engine, and store the message payloads and the attribute values in the persistent data store.

9. The distributed data repository node of claim 8 wherein the persistence management module is further operative to purge the least recently used data object from the content map maintained in the volatile memory as required for new message payloads when the limits of the volatile memory are exceeded.

10. The distributed data repository node of claim 1 further comprising an external messaging agent operative to establish and maintain connections with the at least one other distributed data repository node.

11. The distributed data repository node of claim 8 further comprising a message queuing module operative to maintain at least one message queue, and wherein the message queuing module is operative to receive messages from the mapping engine and the persistence module, place the messages on appropriate message queues, and transmit the queued messages to the mapping engine and the persistence module.

12. The distributed repository node of claim 11 wherein the mapping engine and the persistence module are operative to register with the message queuing module to receive messages from the at least one message queue.

13. The distributed data repository node of claim 1 further comprising a node controller operatively coupled with the network interface to interact with the client nodes and the least one other data repository node.

14. The distributed data repository node of claim 1 further comprising an external messaging agent operatively coupled with the network interface to transmit and receive messages from the at least one other data repository node.

15. The distributed data repository node of claim 1 wherein the content-based filter layer is operative to modify a query based on application of at least one content-based filter.

16. The distributed data repository node of claim 15 wherein the content-based filter layer is further operative to apply at least one policy to the query to select one or more content-based filters; and wherein application of the at least one content based filter to the query is conditioned on selection of at least one content based filter.

17. The distributed data repository node of claim 15 wherein the at least one content based filter includes at least one filter criterion specifying a content element and an extraction method defining extraction of the content element from the message payloads received by the client nodes; and wherein the query is modified based on the at least one filter criterion.

18. The distributed data repository node of claim 1 further comprising a messaging server operative to maintain a directory of other distributed data repository nodes and client nodes to facilitate one-way messaging between the other distributed data repository nodes and the client nodes.

19. The distributed data repository system of claim 1 wherein the message payloads received by the client nodes contain at least one data object.

20. The distributed data repository system of claim 19 wherein the at least one data object is a BLOB.

21. A distributed data repository system, comprising at least two distributed repository nodes, each distributed repository node comprising a memory that stores a content map containing at least one message payload stored in association with a message payload identifier, and at least one index map containing at least one content attribute value and a corresponding message payload identifier;

wherein each distributed repository node is operative to receive message payloads transmitted by client nodes;

apply at least one content-based filter to the message payloads to extract from the message payloads one or more content attribute values corresponding to respective content attributes defined in the at least one content-based filter;

store the message payloads in the content map in association with unique identifiers, store the extracted one or more content attribute values associated with the message payloads in the at least one index map;

synchronize the one or more content attribute values in the at least one index map with the at least one other distributed data repository node;

receive a query including one or more attribute values each corresponding to a respective attribute;

determine one or more unique identifiers for message payloads that match the query, the determining using one or more index maps associated with one or more attributes that correspond to the one or more attribute values; and identify message payloads in the content map using the one or more unique identifiers; and return the identified message payloads in response to the query.

\* \* \* \* \*